United States Patent
Han

(10) Patent No.: US 10,477,096 B2
(45) Date of Patent: Nov. 12, 2019

(54) OBJECT OR AREA BASED FOCUS CONTROL IN VIDEO

(71) Applicant: Samsung Electronics Co., Ltd., Gyeonggi-do (KR)

(72) Inventor: Ho-Suk Han, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/646,377

(22) Filed: Jul. 11, 2017

(65) Prior Publication Data

US 2018/0013949 A1    Jan. 11, 2018

(30) Foreign Application Priority Data

Jul. 11, 2016    (KR) .................. 10-2016-0087619

(51) Int. Cl.
*H04N 5/262*    (2006.01)
*H04N 5/235*    (2006.01)
*H04N 5/232*    (2006.01)
*H04N 5/225*    (2006.01)
*H04N 5/265*    (2006.01)

(52) U.S. Cl.
CPC ....... *H04N 5/23212* (2013.01); *H04N 5/2257* (2013.01); *H04N 5/2352* (2013.01); *H04N 5/2356* (2013.01); *H04N 5/23216* (2013.01); *H04N 5/23293* (2013.01); *H04N 5/265* (2013.01); *G06T 2207/10148* (2013.01); *H04N 5/2621* (2013.01)

(58) Field of Classification Search
CPC ........... H04N 5/23212; H04N 5/23229; H04N 5/2356; H04N 5/3696; H04N 5/262; H04N 5/2621; H04N 5/2624; H04N 5/2625; H04N 5/265; H04N 5/23216; H04N 5/23293; G02B 7/28; G02B 7/34
USPC .................................................. 348/345–350
See application file for complete search history.

(56) References Cited

U.S. PATENT DOCUMENTS

| | | | |
|---|---|---|---|
| 5,282,045 A | 1/1994 | Mimura et al. | |
| 7,620,308 B2 | 11/2009 | Itoh | |
| 7,630,001 B2 * | 12/2009 | Nakasuji | H04N 3/155 348/218.1 |
| 8,035,725 B2 | 10/2011 | Chen et al. | |
| 8,390,729 B2 | 3/2013 | Long et al. | |
| 8,405,739 B2 * | 3/2013 | Tanaka | H04N 5/2357 348/221.1 |
| 8,639,032 B1 * | 1/2014 | Voorhees | G09B 5/02 382/176 |
| 9,118,842 B2 * | 8/2015 | Adams, Jr. | G06T 5/50 |
| 9,384,579 B2 * | 7/2016 | Bhargava | G06T 13/20 |

(Continued)

FOREIGN PATENT DOCUMENTS

WO    2015/195318 A1    12/2015

OTHER PUBLICATIONS

International Search Report dated Oct. 19, 2017.
European Search Report dated Oct. 27, 2017.

*Primary Examiner* — Ngoc Yen T Vu
(74) *Attorney, Agent, or Firm* — Cha & Reiter, LLC

(57) ABSTRACT

Embodiments are directed to an electronic device including a camera module capturing a video, a memory, and a processor sequentially storing, in the memory, each of a plurality of frames respectively focused during the video capture on a plurality of frame areas selected from the video.

20 Claims, 17 Drawing Sheets

(56) References Cited

U.S. PATENT DOCUMENTS

| | | | |
|---|---|---|---|
| 2006/0198623 A1* | 9/2006 | Ono | G03B 13/32 |
| | | | 396/89 |
| 2010/0020221 A1 | 1/2010 | Tupman et al. | |
| 2010/0283868 A1* | 11/2010 | Clark | G11B 27/034 |
| | | | 348/231.4 |
| 2012/0176505 A1* | 7/2012 | Kim | H04N 5/23219 |
| | | | 348/222.1 |
| 2012/0257068 A1 | 10/2012 | Imai | |
| 2012/0300115 A1 | 11/2012 | Okada | |
| 2013/0044237 A1* | 2/2013 | Ikizyan | H04N 5/2355 |
| | | | 348/229.1 |
| 2013/0050564 A1 | 2/2013 | Adams, Jr. et al. | |
| 2013/0322862 A1 | 12/2013 | Hsu | |
| 2013/0329106 A1* | 12/2013 | Bigioi | H04N 5/2254 |
| | | | 348/308 |
| 2014/0092272 A1 | 4/2014 | Choi | |
| 2016/0343288 A1* | 11/2016 | Kim | G06F 3/14 |
| 2018/0241984 A1* | 8/2018 | Sun | G06K 9/00724 |

* cited by examiner

|   | Case1 | Frame rate | | Max exposure | | AF shift |
|---|---|---|---|---|---|---|
|   |   | (fps) | (ms) | (fps) | (ms) | (ms) |
| 1 | Frame Rate → 60fps (change AF shifts) | 60.00 | 16.67 | 321.43 | 3.11 | 8.00 |
| 2 | | 60.00 | 16.67 | 243.24 | 4.11 | 7.00 |
| 3 | | 60.00 | 16.67 | 195.65 | 5.11 | 6.00 |
| 4 | | 60.00 | 16.67 | 163.64 | 6.11 | 5.00 |
| 5 | | 60.00 | 16.67 | 140.63 | 7.11 | 4.00 |
| 6 | | 60.00 | 16.67 | 123.29 | 8.11 | 3.00 |
| 7 | | 60.00 | 16.67 | 109.76 | 9.11 | 2.00 |
| 8 | | 60.00 | 16.67 | 98.90 | 10.11 | 1.00 |

FIG.6A

|   | Case2 | Frame rate | | Max exposure | | AF shift |
|---|---|---|---|---|---|---|
|   |   | (fps) | (ms) | (fps) | (ms) | (ms) |
| 1 | AF Shift → 8ms (change frame rates) | 60.00 | 16.67 | 321.43 | 3.11 | 8.00 |
| 2 | | 50.00 | 20.00 | 155.17 | 6.44 | 8.00 |
| 3 | | 40.00 | 25.00 | 87.38 | 11.44 | 8.00 |
| 4 | | 30.00 | 33.33 | 50.56 | 19.78 | 8.00 |

FIG.6B

OBJECT OR AREA BASED FOCUS CONTROL IN VIDEO

CLAIM OF PRIORITY

This application claims the benefit under 35 U.S.C. § 119 (a) of a Korean patent application filed in the Korean Intellectual Property Office on Jul. 11, 2016 and assigned Serial No. 10-2016-0087619, the entire disclosure of which is incorporated herein by reference.

TECHNICAL FIELD

Various embodiments of the present disclosure relate to generally to focus control, and more particularly to controlling the focus with respect to one or more object or an area of video frames, such as while playing the video back in real-time.

DISCUSSION OF RELATED ART

Recently developed camera-equipped electronic devices are capable of taking a plurality of multi-focus videos using multiple lenses. However, the use of multiple lenses in taking a multi-focus video is inefficient in terms of cost or power consumption.

Moreover, such electronic devices do not allow the user to change the focus of each video in real-time while the video is being played back, or to control exposure time or white balance per frame of each video.

The above information is presented as background information only to assist with an understanding of the present disclosure. No determination has been made, and no assertion is made, as to whether any of the above might be applicable as prior art with regard to the present disclosure.

SUMMARY

According to embodiments of the present disclosure, an electronic device may be capable of changing, in real-time, the focus, exposure time, and/or white balance of a captured video in an object or area selected by the user when playing back the video. Methods for operating the electronic device are also described.

According to an embodiment of the present disclosure, an electronic device may comprise a camera module capturing a video, a memory, and a processor sequentially storing, in the memory, each of a plurality of frames respectively focused, during video capture, on a plurality of areas selected from the video.

According to an embodiment of the present disclosure, a method for operating an electronic device may comprise selecting a plurality of areas from a video obtained from a camera module upon capturing the video, obtaining each of a plurality of frames respectively focused on the plurality of areas selected from the video, and sequentially storing each of the plurality of frames in a memory.

According to an embodiment of the present disclosure, an electronic device may comprise a display, a memory storing first frames focused on a first frame area included in a video and second frames focused on a second frame area included in the video, the second frames alternating with the first frames, and the first and second frames having been captured at a first frame rate; and a processor causing any one of the first frames and the second frames to be played through the display at a second frame rate differing from the first frame rate.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein:

FIG. 6A is a table illustrating sequence values of a plurality of frames according to an embodiment of the present disclosure;

FIG. 6B is another table illustrating sequence values of a plurality of frames according to an embodiment;

DETAILED DESCRIPTION

Figure 1:
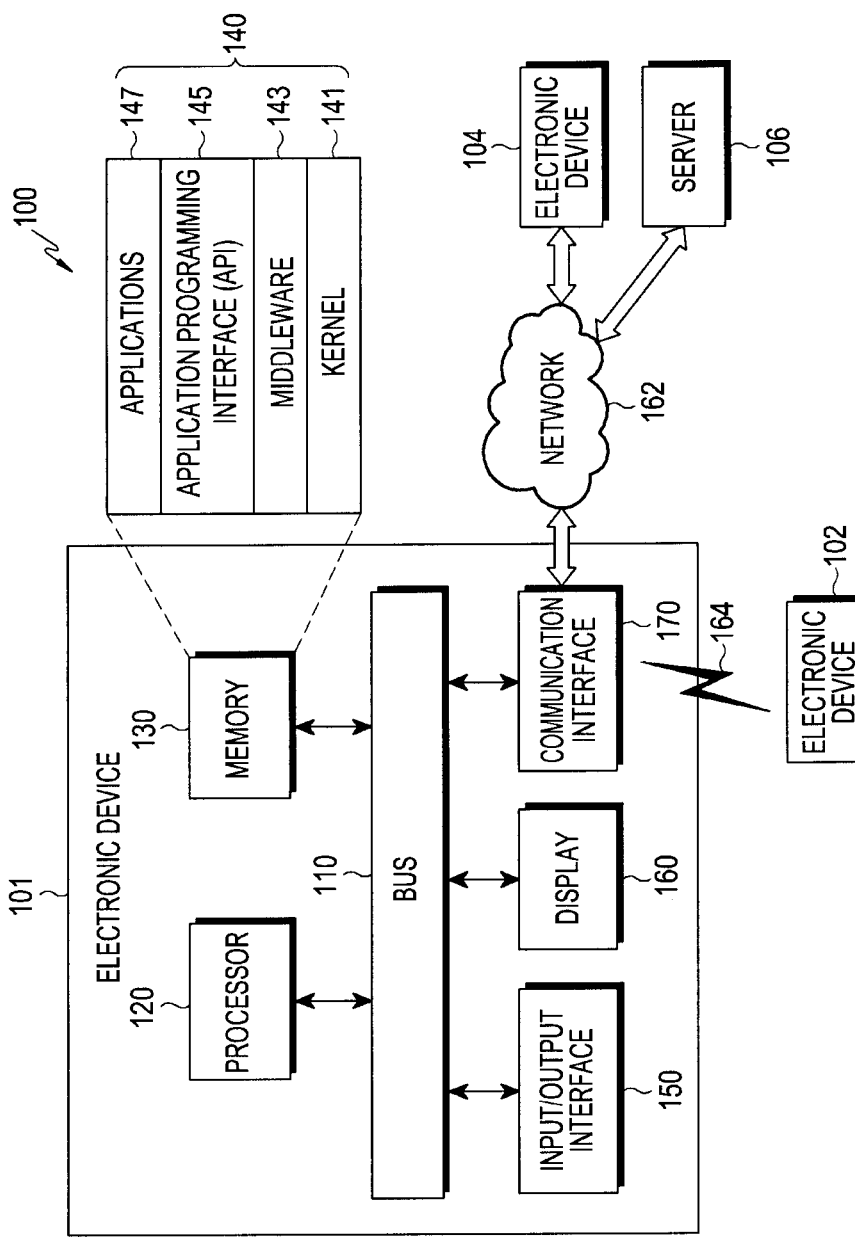
FIG. 1 is a block diagram illustrating an electronic device and a network according to an embodiment of the present disclosure.

Hereinafter, embodiments of the present disclosure are described with reference to the accompanying drawings. However, it should be appreciated that the present disclosure is not limited to the embodiments and the terminology used herein, and all changes and/or equivalents or replacements thereto also belong to the scope of the present disclosure. The same or similar reference denotations may be used to refer to the same or similar elements throughout the specification and the drawings. It is to be understood that the singular forms "a," "an," and "the" include plural references unless the context clearly dictates otherwise. As used herein, the terms "A or B" or "at least one of A and/or B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be interchangeably used with other terms, such as "suitable for," "capable of," "modified to," "made to," "adapted to," "able to," or "designed to" in hardware or software in the context. Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments, examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler). According to various embodiments of the disclosure, examples of the electronic device may at least one of part of a piece of furniture, building/structure or vehicle, an electronic board, an electronic signature receiving device, a projector, or various measurement devices (e.g., devices for measuring water, electricity, gas, or electromagnetic waves). According to embodiments of the present disclosure, the electronic device may be flexible or may be a combination of two or more of the above-enumerated electronic devices. According to an embodiment of the present disclosure, the electronic device is not limited to the above-listed embodiments. As used herein, the term "user" may denote a human or another device (e.g., an artificial intelligent electronic device) using the electronic device.

Referring to FIG. 1, according to an embodiment of the present disclosure, an electronic device 101 is included in a network environment 100. The electronic device 101 may include a bus 110, a processor 120, a memory 130, an input/output interface 150, a display 160, and a communication interface 170. In some embodiments, the electronic device 101 may exclude at least one of the components or may add another component. The bus 110 may include a circuit for connecting the components 110 to 170 with one another and transferring communications (e.g., control messages or data) between the components. The processing module 120 may include one or more of a central processing unit (CPU), an application processor (AP), or a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS). For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example. Further, the middleware 143 may process one or more task requests received from the application program 147 in order of priority. For example, the middleware 143 may assign a priority of using system resources (e.g., bus 110, processor 120, or memory 130) of the electronic device 101 to at least one of the application programs 147 and process one or more task requests. The API 145 is an interface allowing the application 147 to control functions provided from the kernel 141 or the middleware 143. For example, the API 133 may include at least one interface or function (e.g., a command) for filing control, window control, image processing or text control. For example, the input/output interface 150 may transfer commands or data input from the user or other external device to other component(s) of the electronic device 101 or may output commands or data received from other component(s) of the electronic device 101 to the user or other external devices.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user. For example, the communication interface 170 may set up communication between the electronic device 101 and an external electronic device (e.g., a first electronic device 102, a second electronic device 104, or a server 106). For example, the communication interface 170 may be connected with the network 162 through wireless or wired communication to communicate with the external electronic device.

The wireless communication may include cellular communication which uses at least one of, e.g., long term evolution (LTE), long term evolution- advanced (LTE-A), code division multiple access (CDMA), wideband code division multiple access (WCDMA), universal mobile telecommunication system (UMTS), wireless broadband (Wi-Bro), or global system for mobile communication (GSM). According to an embodiment of the present disclosure, the wireless communication may include at least one of, e.g., wireless fidelity (Wi-Fi), Bluetooth, Bluetooth low power (BLE), zigbee, near field communication (NFC), magnetic secure transmission (MST), radio frequency, or body area network (BAN). According to an embodiment of the present disclosure, the wireless communication may include global navigation satellite system (GNSS). The GNSS may be, e.g., global positioning system (GPS), global navigation satellite system (Glonass), navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, power line communication (PLC), or plain old telephone service (POTS). The network 162 may include at least one of telecommunication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 2:
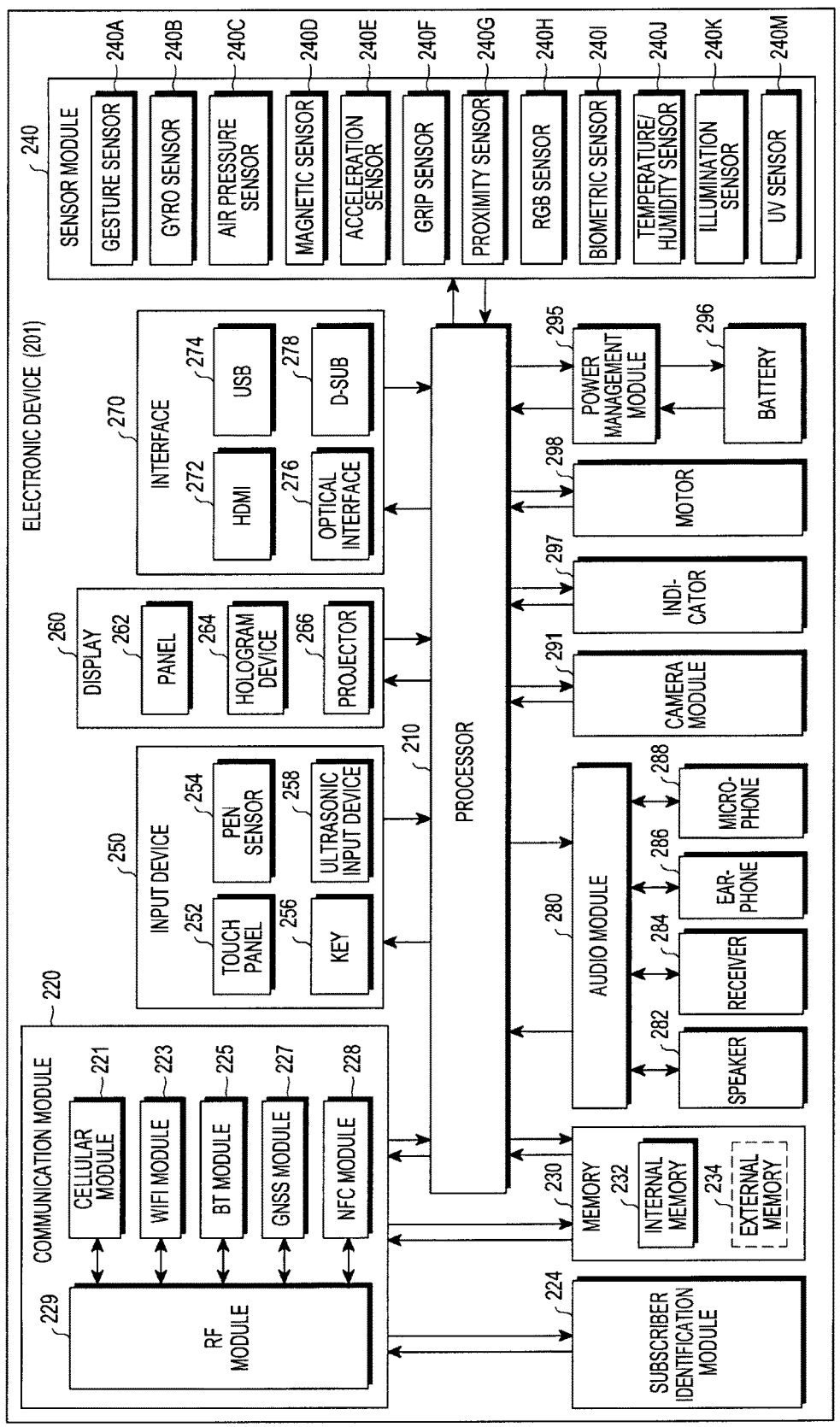
FIG. 2 is a block diagram illustrating an electronic device according to an embodiment of the present disclosure.

FIG. 2 is a block diagram illustrating an electronic device 201 according to an embodiment of the present disclosure; The electronic device 201 may include the whole or part of the configuration of, e.g., the electronic device 101 shown in FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 may control multiple hardware and software components connected to the processor 210 by running, e.g., an operating system or application programs, and the processor 210 may process and compute various data. The processor 210 may be implemented in, e.g., a system on chip (SoC). According to an embodiment of the present disclosure, the processor 210 may further include a graphic processing unit (GPU) and/or an image signal processor (ISP). The processor 210 may include at least some (e.g., the cellular module 221) of the components shown in FIG. 2. The processor 210 may load a command or data received from at least one of other components (e.g., a non-volatile memory) on a volatile memory, process the command or data, and store resultant data in the non-volatile memory.

The communication module 220 may have the same or similar configuration to the communication interface 170 of FIG. 1. The communication module 220 may include, e.g., a cellular module 221, a wireless fidelity (Wi-Fi) module 223, a Bluetooth (BT) module 225, a GNSS module 227, a NFC module 228, and a RF module 229.The cellular module 221 may provide voice call, video call, text, or Internet services through, e.g., a communication network. The cellular module 221 may perform identification or authentication on the electronic device 201 in the communication network using a subscriber identification module 224 (e.g., the SIM card). According to an embodiment of the present disclosure, the cellular module 221 may perform at least some of the functions providable by the processor 210. According to an embodiment of the present disclosure, the cellular module 221 may include a communication processor (CP). According to an embodiment of the present disclosure, at least some (e.g., two or more) of the cellular module 221, the Wi-Fi module 223, the Bluetooth module 225, the GNSS module 227, or the NFC module 228 may be included in a single integrated circuit (IC) or an IC package. The RF module 229 may communicate data, e.g., communication signals (e.g., RF signals). The RF module 229 may include, e.g., a transceiver, a power amplifier module (PAM), a frequency filter, a low noise amplifier (LNA), or an antenna. According to an embodiment of the present disclosure, at least one of the cellular module 221, the Wi-Fi module 223, the Bluetooth module 225, the GNSS module 227, or the NFC module 228 may communicate RF signals through a separate RF module. The subscription identification module 224 may include, e.g., a card including a subscriber identification module, or an embedded SIM, and may contain unique identification information (e.g., an integrated circuit card identifier (ICCID) or subscriber information (e.g., an international mobile subscriber identity (IMSI)).

The memory 230 (e.g., the memory 130) may include, e.g., an internal memory 232 or an external memory 234. The internal memory 232 may include at least one of, e.g., a volatile memory (e.g., a dynamic RAM (DRAM), a static RAM (SRAM), a synchronous dynamic RAM (SDRAM), etc.) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD). The external memory 234 may include a flash drive, e.g., a compact flash (CF) memory, a secure digital (SD) memory, a micro-SD memory, a min-SD memory, an extreme digital (xD) memory, a multi-media card (MMC), or a memory stick™. The external memory 234 may be functionally or physically connected with the electronic device 201 via various interfaces.

For example, the sensor module 240 may measure a physical quantity or detect an operational state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB) sensor), a bio sensor 240I, a temperature/humidity sensor 240J, an illumination sensor 240K, or an Ultra Violet (UV) sensor 240M. Additionally or alternatively, the sensor module 240 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an embodiment of the present disclosure, the electronic device 201 may further include a processor conFIGured to control the sensor module 240 as part of the processor 210 or separately from the processor 210, and the electronic device 201 may control the sensor module 240 while the processor 210 is in a sleep mode.

The input unit 250 may include, e.g., a touch panel 252, a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction. The (digital) pen sensor 254 may include, e.g., a part of a touch panel or a separate sheet for recognition. The key 256 may include e.g., a physical button, optical key or key pad. The ultrasonic input device 258 may sense an ultrasonic wave generated from an input tool through a microphone (e.g., the microphone 288) to identify data corresponding to the sensed ultrasonic wave.

The display 260 (e.g., the display 160) may include a panel 262, a hologram device 264, a projector 266, and/or a control circuit for controlling the same. The panel 262 may be implemented to be flexible, transparent, or wearable. The panel 262, together with the touch panel 252, may be configured in one or more modules. According to an embodiment of the present disclosure, the panel 262 may include a pressure sensor (or pose sensor) that may measure the strength of a pressure by the user's touch. The pressure sensor may be implemented in a single body with the touch panel 252 or may be implemented in one or more sensors separate from the touch panel 252. The hologram device 264 may make three dimensional (3D) images (holograms) in the air by using light interference. The projector 266 may display an image by projecting light onto a screen. The screen may be, for example, located inside or outside of the electronic device 201. The interface 270 may include e.g., a high definition multimedia interface (HDMI) 272, a USB 274, an optical interface 276, or a D-subminiature (D-sub) 278. The interface 270 may be included in e.g., the communication interface 170 shown in FIG. 1. Additionally or alternatively, the interface 270 may include a mobile high-definition link (MHL) interface, a secure digital (SD) card/multimedia card (MMC) interface, or infrared data association (IrDA) standard interface.

The audio module 280 may converting, e.g., a sound signal into an electrical signal and vice versa. At least a part of the audio module 280 may be included in e.g., the input/output interface 150 as shown in FIG. 1. The audio module 280 may process sound information input or output through e.g., a speaker 282, a receiver 284, an earphone 286, or a microphone 288. For example, the camera module 291 may be a device for capturing still images and videos, and may include, according to an embodiment of the present disclosure, one or more image sensors (e.g., front and back sensors), a lens, an image signal processor (ISP), or a flash such as an LED or xenon lamp. The power manager module 295 may manage power of the electronic device 201, for example. According to an embodiment of the present disclosure, the power manager module 295 may include a power management Integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. The electronic device 201 may include a mobile TV supporting device (e.g., a GPU) that may process media data as per, e.g., digital multimedia broadcasting (DMB), digital video broadcasting (DVB), or mediaFlo™ standards. Each of the aforementioned components of the electronic device may include one or more parts, and a name of the part may vary with a type of the electronic device. According to various embodiments, the electronic device (e.g., the electronic device 201) may exclude some elements or include more elements, or some of the elements may be combined into a single entity that may perform the same function as by the elements before combined.

Figure 3:
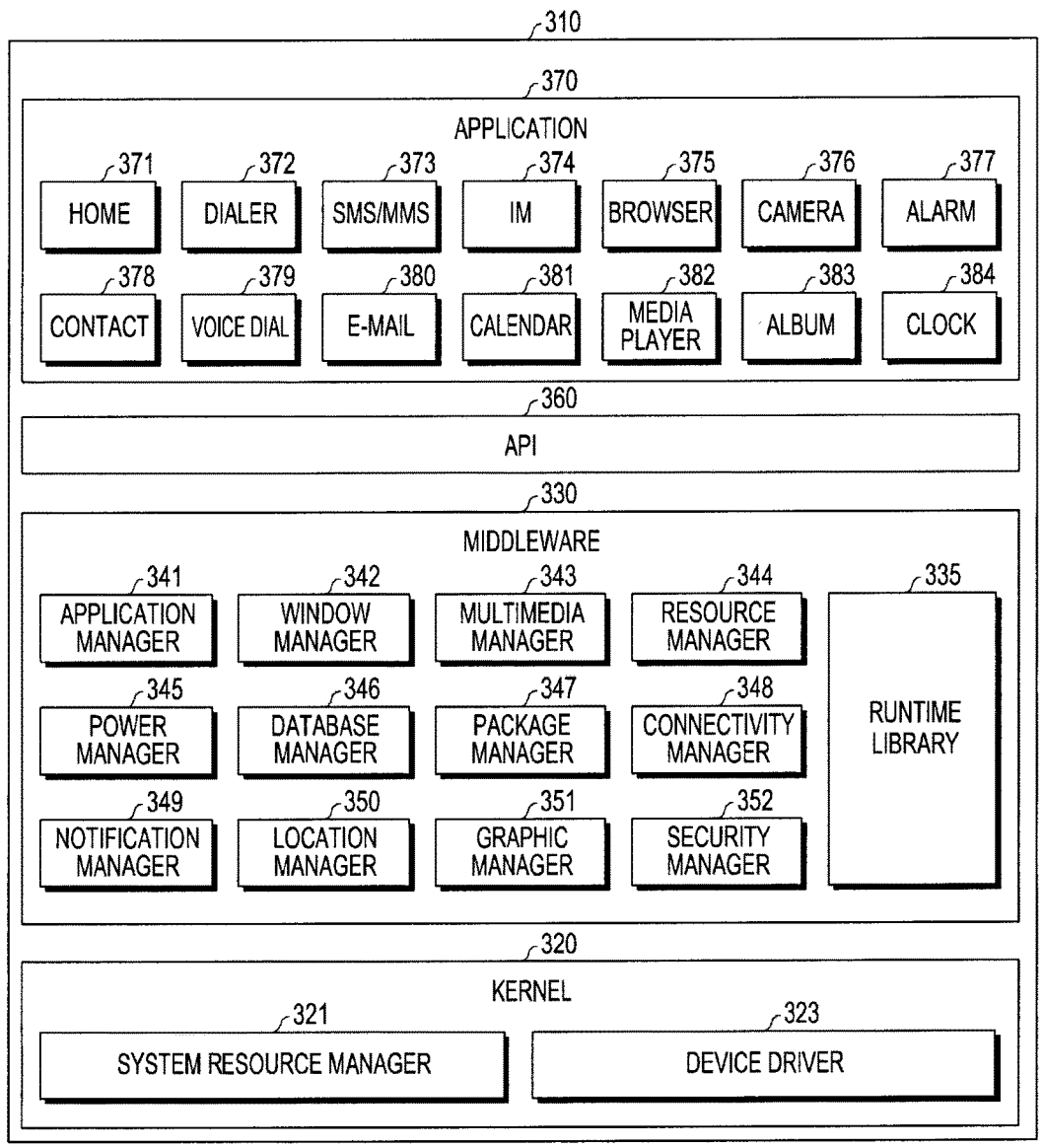
FIG. 3 is a block diagram illustrating a program module according to an embodiment of the present disclosure.

FIG. 3 is a block diagram illustrating a program module according to an embodiment of the present disclosure; According to an embodiment of the present disclosure, the program module 310 (e.g., the program 140) may include an operating system (OS) controlling resources related to the electronic device (e.g., the electronic device 101) and/or various applications (e.g., the application processor 147) driven on the operating system. The operating system may include, e.g., Android™, iOS™, Windows™, Symbian™, Tizen™, or Bada™. Referring to FIG. 3, the program module 310 may include a kernel 320 (e.g., the kernel 141), middleware 330 (e.g., the middleware 143), an API 360 (e.g., the API 145), and/or an application 370 (e.g., the application program 147). At least a part of the program module 310 may be preloaded on the electronic device or may be downloaded from an external electronic device (e.g., the electronic devices 102 and 104 or server 106).

The kernel 320 may include, e.g., a system resource manager 321 or a device driver 323. The system resource manager 321 may perform control, allocation, or recovery of system resources. According to an embodiment of the present disclosure, the system resource manager 321 may include a process managing unit, a memory managing unit, or a file system managing unit. The device driver 323 may include, e.g., a display driver, a camera driver, a Bluetooth driver, a shared memory driver, a USB driver, a keypad driver, a Wi-Fi driver, an audio driver, or an inter-process communication (IPC) driver. The middleware 330 may provide various functions to the application 370 through the API 360 so that the application 370 may use limited system resources in the electronic device or provide functions jointly required by applications 370. According to an embodiment of the present disclosure, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or arithmetic function processing. The application manager 341 may manage the life cycle of, e.g., the applications 370. The window manager 342 may manage GUI resources used on the screen. The multimedia manager 343 may grasp formats necessary to play media files and use a codec appropriate for a format to perform encoding or decoding on media files. The resource manager 344 may manage the source code or memory space of the application 370. The power manager 345 may manage, e.g., the battery capability or power and provide power information necessary for the operation of the electronic device. According to an embodiment of the present disclosure, the power manager 345 may interwork with a basic input/output system (BIOS). The database manager 346 may generate, search, or vary a database to be used in the applications 370. The package manager 347 may manage installation or update of an application that is distributed in the form of a package file.

The connectivity manager 348 may manage, e.g., wireless connectivity. The notification manager 349 may provide an event, e.g., arrival message, appointment, or proximity alert, to the user. The location manager 350 may manage, e.g., locational information on the electronic device. The graphic manager 351 may manage, e.g., graphic effects to be offered to the user and their related user interface. The security manager 352 may provide system security or user authentication, for example. According to an embodiment of the present disclosure, the middleware 330 may include a telephony manager for managing the voice or video call function of the electronic device or a middleware module able to form a combination of the functions of the above-described elements. According to an embodiment of the present disclosure, the middleware 330 may provide a module specified according to the type of the operating system. The middleware 330 may dynamically omit some existing components or add new components. The API 360 may be a set of, e.g., API programming functions and may have different configurations depending on operating systems. For example, in the case of Android or iOS, one API set may be provided per platform, and in the case of Tizen, two or more API sets may be offered per platform.

The application 370 may include an application that may provide, e.g., a home 371, a dialer 372, an SMS/MMS 373, an instant message (IM) 374, a browser 375, a camera 376, an alarm 377, a contact 378, a voice dial 379, an email 380, a calendar 381, a media player 382, an album 383, or a clock 384, a health-care (e.g., measuring the degree of workout or blood sugar), or provision of environmental information (e.g., provision of air pressure, moisture, or temperature information). According to an embodiment of the present disclosure, the application 370 may include an information exchanging application supporting information exchange between the electronic device and an external electronic device. Examples of the information exchange application may include, but is not limited to, a notification relay application for transferring specific information to the external electronic device, or a device management application for managing the external electronic device. For example, the notification relay application may transfer notification information generated by other application of the electronic device to the external electronic device or receive notification information from the external electronic device and provide the received notification information to the user. For example, the device management application may install, delete, or update a function (e.g., turn-on/turn-off the external electronic device (or some elements) or adjusting the brightness (or resolution) of the display) of the external electronic device communicating with the electronic device or an application operating on the external electronic device. According to an embodiment of the present disclosure, the application 370 may include an application (e.g., a health-care application of a mobile medical device) designated according to an attribute of the external electronic device. According to an embodiment of the present disclosure, the application 370 may include an application received from the external electronic device. At least a portion of the program module 310 may be implemented (e.g., executed) in software, firmware, hardware (e.g., the processor 210), or a combination of at least two or more thereof and may include a module, program, routine, command set, or process for performing one or more functions.

As used herein, the term "module" includes a unit configured in hardware, hardware that executes software, or firmware and may be interchangeably used with other term, e.g., a logic, logic block, part, or circuit. The module may be a single integral part or a minimum unit or part of performing one or more functions. The module may be implemented mechanically or electronically and may include, e.g., an application-specific integrated circuit (ASIC) chip, field-programmable gate arrays (FPGAs), or programmable logic device, that has been known or to be developed in the future as performing some operations. According to an embodiment of the present disclosure, at least a part of the device (e.g., modules or their functions) or method (e.g., operations) may be implemented as instructions stored in a non-transitory computer-readable storage medium (e.g., the memory 130), e.g., in the form of a program module. The instructions, when executed by a processor (e.g., the processor 120), may enable the processor to carry out a corresponding function. Examples of the non-transitory computer-readable medium may include, e.g., a hard disk, a floppy disc, a magnetic medium (e.g., magnetic tape), an optical recording medium (e.g., CD-ROM, DVD, magnetic-optical medium (e.g., floptical disk), or an embedded memory. The instruction may include a code created by a compiler or a code executable by an interpreter. Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, in parallel, repeatedly or heuristically, or at least some operations may be executed in a different order or omitted or other operations may be added.

Figure 4:
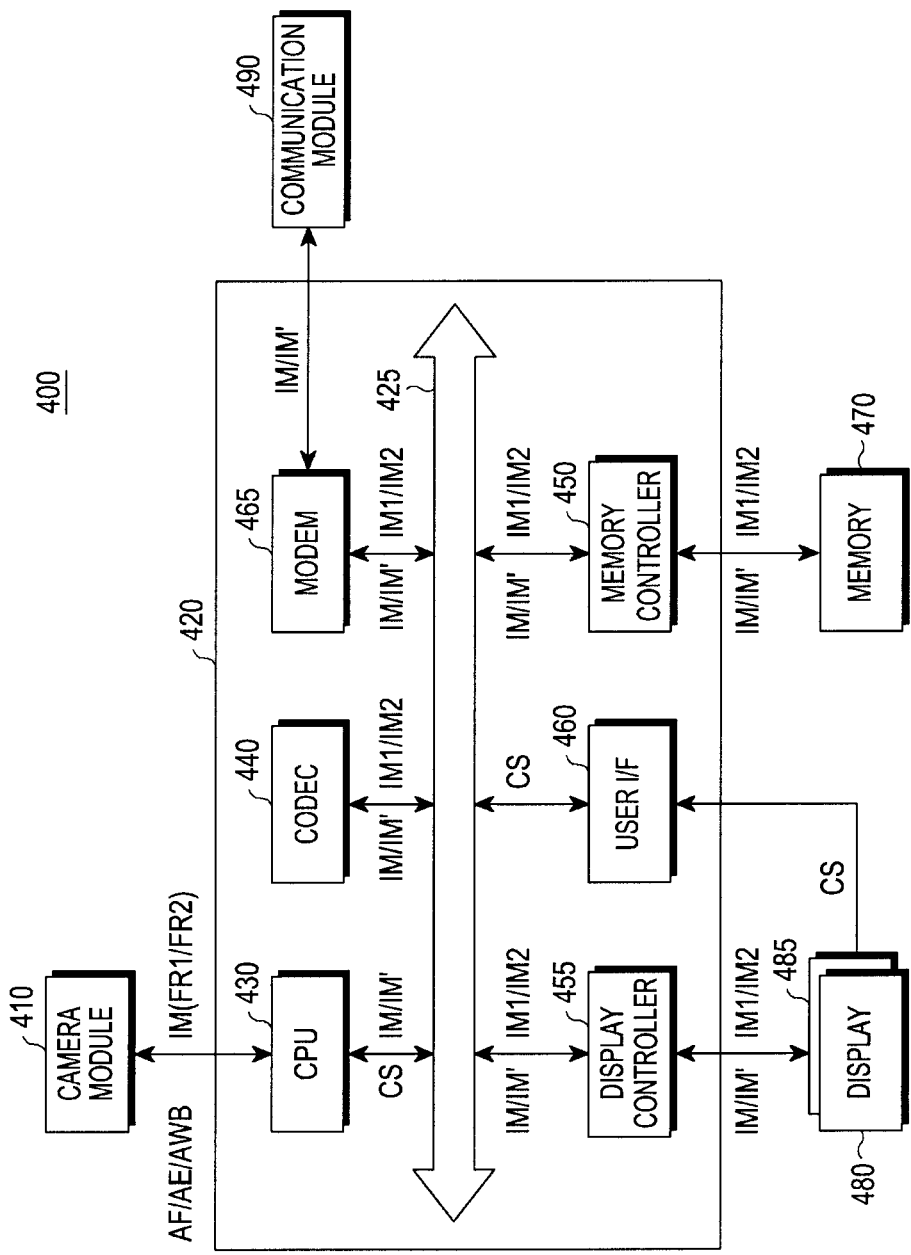
FIG. 4 is a block diagram schematically illustrating an electronic device according to an embodiment of the present disclosure.

Although two or three types of frames are described to be included in a video (IM) for ease of description, the technical spirit of the present disclosure is not limited thereto. In FIG. 4, legends such as IM, IM1, etc. may each denote a video comprised of a periodic sequence of frames (images) captured with focus on a particular selected object or area, or objects/areas at a particular depth in an overall video.

FIG. 4 is a block diagram schematically illustrating an electronic device according to an embodiment of the present disclosure.

Referring to FIG. 4, the electronic device 400 may include a camera module 410, a processor 420, a memory 470, a display 480, and a communication module 490.

The electronic device 400 may sequentially generate (or capture) a plurality of frames respectively focused on a plurality of areas selected in a video obtained through the camera module 410. Here, the term "sequentially" may mean that the plurality of frames respectively focused on the plurality of areas may be "sequentially and alternately" generated. For instance, in the case of two types of frames, a first frame A designed with a focus on a first object or frame area in the frame may alternate periodically with a second frame B designed with a focus on a second object or frame area in the video. As a result, two videos may be generated from the overall video—a first video composed of the A frames and a second video composed of the B frames.

Further, the electronic device 400 may store and play back each of the plurality of frames. The electronic device 400 may edit each of the plurality of frames.

The camera module 410 may include an image sensor. The camera module 410 may capture an object to generate a video IM for the object. For example, the video may include a plurality of frames.

According to an embodiment of the present disclosure, the camera module 410 may capture (or obtain) the video IM including the plurality of frames. For example, the camera module 410 may capture (or obtain) a video IM including a plurality N of frames respectively focused on a plurality M of areas.

The video IM may mean a motion picture (or motion picture data) including a plurality of frames. According to an embodiment of the present disclosure, the video IM may mean a motion picture (or motion picture data) including a plurality of frames respectively focused on a plurality of areas.

The processor 420 may control the overall operation of the electronic device 400. For example, the processor 420 may be implemented as an application processor, a processor for personal computer (PC), and/or a processor for server.

According to an embodiment of the present disclosure, the processor 420 may sequentially store, in the memory 470, each of a plurality of frames respectively focused on a plurality of areas selected from the video IM obtained through the camera module 410. Further, the processor 420 may edit each of the plurality of frames and replay the same on the display 480.

According to an embodiment of the present disclosure, the processor 420 may sequentially store, in the memory 450, each of a plurality of frames respectively focused on a plurality of areas selected from the video obtained through the camera module 410.

The processor 420 may control the focus shift time and exposure time of each of the plurality of frames. The processor 420 may also control the white balance of each of the plurality of frames.

For example, the focus shift time may mean a time taken for the focusing to shift from an area in the video IM to another. The exposure time may mean a time during which the image sensor in the camera module 410 is exposed to the object so as to read out the plurality of frames in the video IM.

According to an embodiment of the present disclosure, the processor 420 may alternately store, in the memory 470, a first frame FR1 focused on a first area in the video IM and a second frame FR2 focused on a second area in the video IM, which is different from the first area.

The first area may mean a frame area included in the video IM. The second area may mean a second frame area different from the first area included in the video IM. Here, focusing on the first area and the second area may be determined automatically by the processor 420 or by the user's selection. For example, where the first area and the second area are determined automatically by the processor 420, the first area and the second area may be determined by an object included in the video IM or by the depth.

According to an embodiment of the present disclosure, the processor 420 may determine a first focus shift time during which focusing shifts from the first area to the second area. The processor 420 may also determine a second focus shift time during which focusing on the second area is changed to focusing on the first area.

The processor 420 may determine the exposure time of the second frame FR2 based on the first focus shift time. The processor 420 may also determine the exposure time of the first frame FR1 based on the second focus shift time. The processor 420 may adjust the sensitivity of the camera module 410 (or the image sensor included in the camera module 410) based on the exposure time of the first frame FR1 or the exposure time of the second frame FR2.

The processor 420 may generate a pan focus image using the first frame FR1 and the second frame FR2. The processor 420 may also generate a high definition range (HDR) video using the first frame FR1 and the second frame FR2.

The processor 420 may include a central processing unit (CPU) 430, a codec 440, a memory controller 450, a display controller 455, a user interface 460, and a modem 465. The components 430, 440, 450, 455, 460, and 465 of the processor 420 each may transmit or receive data via a bus 425.

The CPU 430 may control the overall operation of the processor 420. For example, the CPU 430 may be implemented as a digital signal processor (DSP).

According to an embodiment of the present disclosure, the CPU 430 may control the plurality of frames in the video IM obtained from the camera module 410.

For example, the CPU 430 may control the frame rate of the plurality of frames captured by the camera module 410. The CPU 430 may also control the focus area, exposure time, and/or white balance of each of the plurality of frames.

For example, the CPU 430 may transmit a focus control signal AF, an exposure control signal AE, and/or a white balance control signal AWB to the camera module 410. The focus control signal AF may refer to a signal for controlling the focus area and focus shift time of each of the plurality of frames. The exposure control time AE may refer to a signal for controlling the exposure time of each of the plurality of frames. The white balance control signal (AWB) may refer to a signal for controlling the white balance of each of the plurality of frames.

According to an embodiment of the present disclosure, the CPU 430 may control the camera module 410 according to camera operation modes.

For example, in a normal mode, the CPU 430 may control the camera module 410 to capture (or obtain) a video including a plurality of frames focused on a particular area. In a selection mode, the CPU 430 may control the camera module 410 to capture (or obtain) a video IM including a plurality of frames respectively focused on a plurality of areas. In the selection mode, the CPU 430 may transmit, to the codec 440, the video IM including the plurality of frames respectively focused on the plurality of areas. Meanwhile, the normal mode and the selection mode may be set automatically or by the user.

The codec 440 may convert the video IM received from the CPU 430. The codec 440 may also convert a video IM' received from an external device.

According to an embodiment of the present disclosure, the codec 440 may receive the video IM including each of the plurality of frames from the CPU 430.

The codec 440 may generate a first video and/or a second video using the video received from the CPU 430.

According to an embodiment of the present disclosure, the codec 440 may generate a first video IM1 and/or a second video IM2 from the plurality of frames. For example, the first video IM1 may be a motion picture (or motion picture data) containing periodic first frames FR1 focused on a first area among the frames. The second video IM2 may be a motion picture (or motion picture data) containing periodic second frames FR2 focused on a second area different from the first area among the plurality of frames. Thus, the first video IM1 may be generated from a first subset of the plurality of frames while the second video IM2 may be generated from a second subset of the plurality of frames.

The codec 440 may generate a first video IM1 containing first frames FR1 focused on a first area and a second video IM2 containing second frames FR2 focused on a second area using the video IM' received from the external device.

The codec 440 may transmit the first video IM1 and the second video IM2 to the memory controller 450 and/or the display controller 455 under the control of the CPU 430. The codec 440 may also transmit the first video IM1 and the second video IM2 to the modem 465 under the control of the CPU 430.

For example, the codec 440 may be implemented in hardware or firmware. Although FIG. 4 illustrates an example in which the codec 440 is implemented separately from the CPU 430 for ease of description, the codec 440 may be included in the CPU 430.

According to an embodiment of the present disclosure, the codec 440 may generate the first video IM1 and/or the second video IM2 based on a selection signal CS received from the user interface 460. For example, when the selection signal indicates the first area, the codec 440 may generate the first video IM1 under the control of the CPU 430. When the selection signal indicates the second area, the codec 440 may generate the second video IM2 under the control of the CPU 430.

The memory controller 450 may store, in the memory 470, the video IM, IM1, or IM2 outputted from the CPU 430 or the codec 440.

For example, the memory 470 may store the video IM, IM1, or IM2 outputted from the CPU 430 or the codec 440. A volatile or non-volatile memory may be implemented as the memory 470.

The display controller 455 may transmit, to the display 480, the video IM, IM1, or IM2 outputted from the CPU 430 or the codec 440. For example, the display controller 455 may transmit the video IM, IM1, or IM2 to the display 480 through a display serial interface (DSI).

The display 480 may display (or play) the video IM, IM1, or IM2 generated by the CPU 430 or codec 440.

The display 480 may include a touch screen 485.

The touch screen 485 may receive an input (or touch input) from the user.

According to an embodiment of the present disclosure, the touch screen 485 may generate a selection signal in response to a focus area selected by the user and transmit the selection signal CS to the user interface 460. For example, when the user selects a first area, the touchscreen 485 may transmit a selection signal CS indicating the first area to the user interface 460. For example, when the user selects a second area, the touch screen 485 may transmit a selection signal CS indicating the second area to the user interface 460. Here, the selection signal CS may mean a signal including information about an area that the user selects and the camera module 410 focuses.

The user interface 460 may receive an input signal (or touch signal) from the touchscreen 485 and transmit data corresponding to the input signal to the CPU 430. For example, the user interface 460 may transmit a selection signal received from the touchscreen 485 to the CPU 430.

The modem 465 may transmit, to the communication module 490, the video IM1, IM1, and/or IM2 generated by the CPU 430 or codec 440, so that the video can be transmitted to the external device. The modem 465 may also receive, through the communication module 490, the video IM' received from the external device. The modem 465 may transmit the video IM' received from the external device to the CPU 430 or the codec 440.

The video IM' received from the external device may be a video substantially the same or similar to the video IM obtained through the camera module 410.

Figure 5:
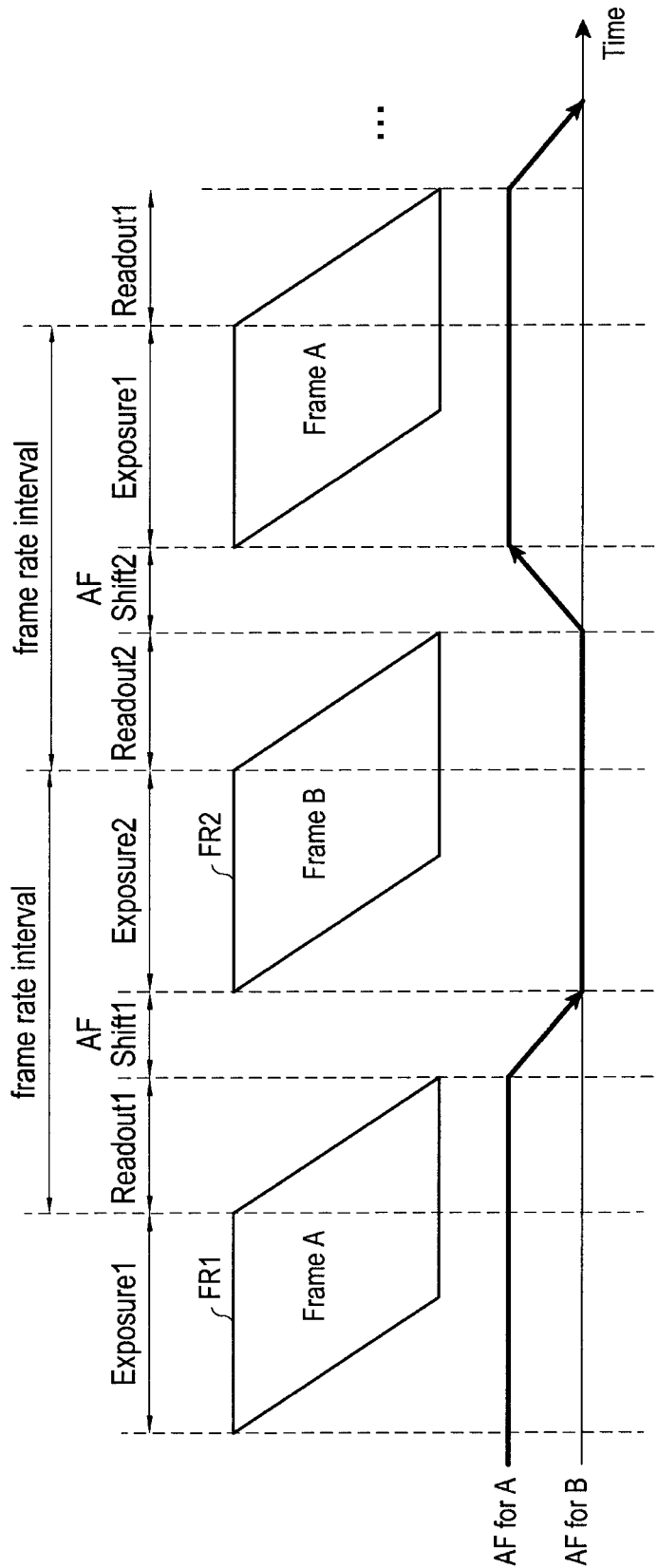
FIG. 5 is a block diagram illustrating a sequence of a plurality of frames according to an embodiment of the present disclosure.

FIG. 5 is a block diagram illustrating a sequence of a plurality of frames according to an embodiment of the present disclosure.

Referring to FIGS. 4 and 5, the camera module 410 may capture (or obtain) a video including a first frame FR1 focused on a first area in the video and a second frame FR2 focused on a second area under the control of the processor 420.

For ease of description, the first area and the second area, respectively, are hereinafter denoted with A and B.

The processor 420 may focus a plurality of frames included in the video IM obtained by the camera module 410 to a plurality of areas, respectively.

For example, the processor 420 may focus a first frame FR1 on a first area and a second frame FR2 on a second area. At this time, the processor 420 may control a first exposure time EXPOSURE1 and a first focus shift time AF SHIFT1 of the first frame FR1. The processor 420 may also control a second exposure time EXPOSURE2 and a second focus shift time AF SHIFT2 of the second frame FR2.

The processor 420 may adjust the first exposure time EXPOSURE1 and the first focus shift time AF SHIFT1 periodically within a preset frame rate interval. The processor 420 may adjust the second exposure time EXPOSURE2 and the second focus shift time AF SHIFT2 periodically within a preset frame rate interval. The frame rate may be set by the processor 420 or the user.

For example, the frame rate interval may encompass the sum of a first readout time READOUT1, the first focus shift time AF SHIFT1, and the second exposure time EXPOSURE2. The frame rate interval may also encompass the sum of a second readout time READOUT2, the second focus shift time AF SHIFT2, and the first exposure time EXPOSURE1.

The first focus shift time AF SHIFT1 may mean a time of shifting (or moving) from focusing on the first area to focusing on the second area. The second focus shift time AF SHIFT2 may mean a time of shifting (or moving) from focusing on the second area to focusing on the first area.

The first exposure time (EXPOSURE1) may mean a time of exposure to an object to read out (or obtain) the first frame FR1. The second exposure time (EXPOSURE2) may mean a time of exposure to an object to read out the second frame FR2.

The first readout time READOUT1 may mean a time during which the image sensor of the camera module 410 outputs the first frame FR1. The second readout time READOUT2 may mean a time during which the image sensor of the camera module 410 outputs the second frame FR2.

The processor 420 may shift the focusing on the first area of the camera module 410 to the second area. At this time, the processor 420 may control the first exposure time EXPOSURE1 for the first frame FR1. For example, the processor 420 may decrease or increase the first exposure time EXPOSURE1 for the first frame FR1.

The processor 420 may also shift the focusing on the second area of the camera module 410 to the first area. At this time, the processor 420 may control the second exposure time EXPOSURE2 for the second frame FR2. For example, the processor 420 may decrease or increase the second exposure time EXPOSURE2 for the second frame FR2.

According to an embodiment of the present disclosure, where the first exposure time EXPOSURE1 and/or the second exposure time EXPOSURE2 are insufficient, the processor 420 may adjust the sensitivity of the image sensor included in the camera module 410. For example, where the first exposure time EXPOSURE1 and/or the second exposure time EXPOSURE2 are shorter than a preset time, the processor 420 may increase the sensitivity of the image sensor included in the camera module 410.

The processor 420 may control the white balance of each of the plurality of frames. For example, the processor 420 may control the white balance of each of the first frame FR1 and the second frame FR2.

FIGS. 6A and 6B are tables illustrating sequence values of a plurality of frames according to an embodiment of the present disclosure.

Referring to FIGS. 5 and 6B, the processor 420 may adjust the exposure times EXPOSURE1 and EXPOSURE2 and the focus shift times AF SHIFT1 and AF SHIFT2 within a preset frame rate. For example, the frame rate may be set to be 60 frames per second (fps).

According to an embodiment of the present disclosure, the processor 420 may vary the focus shift times AF SHIFT1 and AF SHIFT2. The processor 420 may determine a maximum exposure time MAX EXPOSURE based on the varied focus shift times AF SHIFT1 and AF SHIFT2. The processor 420 may control the exposure times EXPOSURE1 and EXPOSURE2 within the determined maximum exposure time MAX EXPOSURE.

For example, where the focus shift times AF SHIFT1 and AF SHIFT2 are 8 ms, the maximum exposure time MAX EXPOSURE may be determined to be 3.11 ms. In this case, processor 420 may control the exposure time of the frames FR1 and FR2 within the maximum exposure time MAX EXPOSURE, i.e., 3.11 ms. Where the focus shift times AF SHIFT1 and AF SHIFT2 are 1 ms, the maximum exposure time MAX EXPOSURE may be determined to be 10.11 ms. In this case, processor 420 may control the exposure time of the frames FR1 and FR2 within the maximum exposure time MAX EXPOSURE, i.e., 10.11 ms. In other words, as the focus shift time increases, the maximum exposure time MAX EXPOSURE may decrease.

According to an embodiment of the present disclosure, where the maximum exposure time MAX EXPOSURE is insufficient (or shorter than a preset time), the processor 420 may adjust (e.g., increase) the sensitivity of the image sensor in the camera module 410. Where the maximum exposure time MAX EXPOSURE is sufficient (or longer than the preset time), the processor 420 may adjust (e.g., decrease) the sensitivity of the image sensor in the camera module 410.

Referring to FIGS. 5 and 6B, the processor 420 may adjust the second exposure times EXPOSURE1 and EXPOSURE2 and the focus shift times AF SHIFT1 and AF SHIFT2 within a preset frame rate.

According to an embodiment of the present disclosure, when the focus shift times AF SHIFT1 and AF SHIFT2 are set to be predetermined times, the processor 420 may change the maximum exposure time MAX EXPOSURE according to the frame rate. In other words, the processor 420 may secure the maximum exposure time MAX EXPOSURE by adjusting the frame rate.

For example, where the frame rate is 60 fps, the maximum exposure time MAX EXPOSURE may be determined to be 3.11 ms. Here, processor 420 may control the exposure time of the frames FR1 and FR2 within the maximum exposure time MAX EXPOSURE, i.e., 3.11 ms. Where the frame rate is 30 fps, the maximum exposure time MAX EXPOSURE may be determined to be 19.78 ms. In this scenario, the processor 420 may control the exposure time of the frames FR1 and FR2 within the maximum exposure time MAX EXPOSURE, i.e., 19.78 ms. In other words, as the frame rate increases, the maximum exposure time MAX EXPOSURE as assigned may decrease.

According to an embodiment of the present disclosure, where the maximum exposure time is insufficient (or shorter than a preset time), the processor 420 may control the maximum exposure time by adjusting (e.g., decreasing) the frame rate. Where the maximum exposure time is sufficient (or longer than the preset time), the processor 420 may adjust (e.g., increase) the frame rate.

Figure 7A:
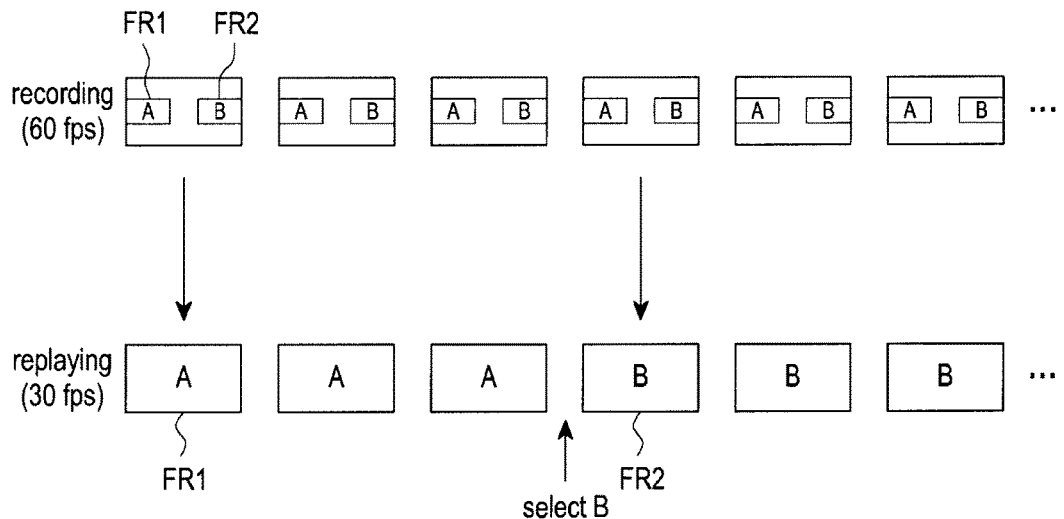
FIG. 7A is a diagram illustrating a plurality of frames according to an embodiment of the present disclosure.
Figure 7B:
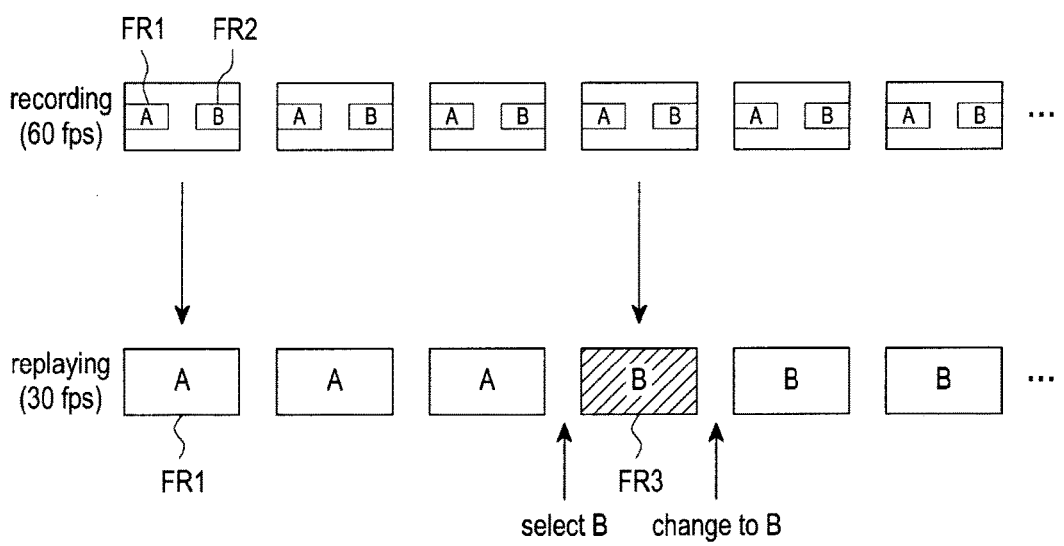
FIG. 7B is another diagram illustrating a plurality of frames according to an embodiment.

FIGS. 7Aa and 7B are diagrams illustrating a plurality of frames according to an embodiment of the present disclosure.

Referring to FIGS. 4 to 7A, the processor 420 may obtain (or record) a first frame FR1 focused on a first area in a video IM and a second frame FR2 focused on a second area using the camera module 410. In this example, the processor 420 may alternately obtain the first frame FR1 and the second frame FR2.

According to an embodiment of the present disclosure, the processor 420 may alternately obtain the first frame FR1 and the second frame FR2. For example, the processor 420 may alternately obtain (or record) the first frame FR1 and the second frame FR2 at a first frame rate (e.g., 60 fps).

The processor 420 may generate a first video IM1 using each of frames (e.g., the first frame FR1) focused on the first area. The processor 420 may generate a second video IM2 using each of frames (e.g., the second frame FR2) focused on the second area.

The processor 420 may generate the first video IM1 and/or the second video IM2 at a second frame rate. Here, the second frame rate may be determined based on the number of types of the plurality of frames. For example, where the plurality of frames include two types of frames (e.g., the first frame FR1 and the second frame FR2), the second frame rate may be ½ of the first frame rate. In other words, where the plurality of frames include N types of frames (N is a positive integer not smaller than two), the second frame rate may be 1/N of the first frame rate.

According to an embodiment of the present disclosure, the processor 420 may play back the first video IM1 at the second frame rate. The processor 420 may also play back the second video IM2 at the second frame rate. Here, the second frame rate may be a half, i.e., 30 fps, of the first frame rate. (Herein, phrases such as "the processor plays back the video" or "the processor displays" refer to the processor causing the video to be played back or displayed, through control of, and outputting data and control signals to, a display device.)

According to an embodiment of the present disclosure, the processor 420 may play back the second video IM2 according to the user's selection while the first video IM1 is played back.

For example, when the user selects the second area while the first video IM1 is played back, the processor 420 may replay the second video IM2. In other words, the processor 420 may display the second video IM2 focused on the second area in response to the user's selection while displaying the first video IM1 focused on the first area.

Referring to FIGS. 4 to 7B, the processor 420 may display the second video IM2 focused on the second area in response to the user's selection while displaying the first video IM1 focused on the first area.

According to an embodiment of the present disclosure, the processor 420 may immediately or gradually change the first video IM1 to the second video IM2 and play back the same in response to the user's selection.

For example, the processor 420 may gradually change the first video IM1 to the second video IM2 and display the same in response to the user's selection. The processor 420 may also provide the user with such an effect as if the first video IM1 changes to the second video IM2, e.g., a visual, tactile, and/or auditory effect as such.

According to an embodiment of the present disclosure, the processor 420 may generate a third frame FR3 using the first frame FR1 and the second frame FR2. For example, the third frame FR3 may mean a frame focused on a middle area between the first area and the second area.

For example, the processor 420 may display the second video IM2 focused on the second area and the third frame FR3 focused on the middle area in response to the user's selection while displaying the first video IM1 focused on the first area. In other words, the processor 420 may play back the third frame FR3 while changing from the first video IM1 to the second video IM2, providing the user with such an effect as if the frame focused on the first area gradually changes to the frame focused on the second area.

Figure 8:
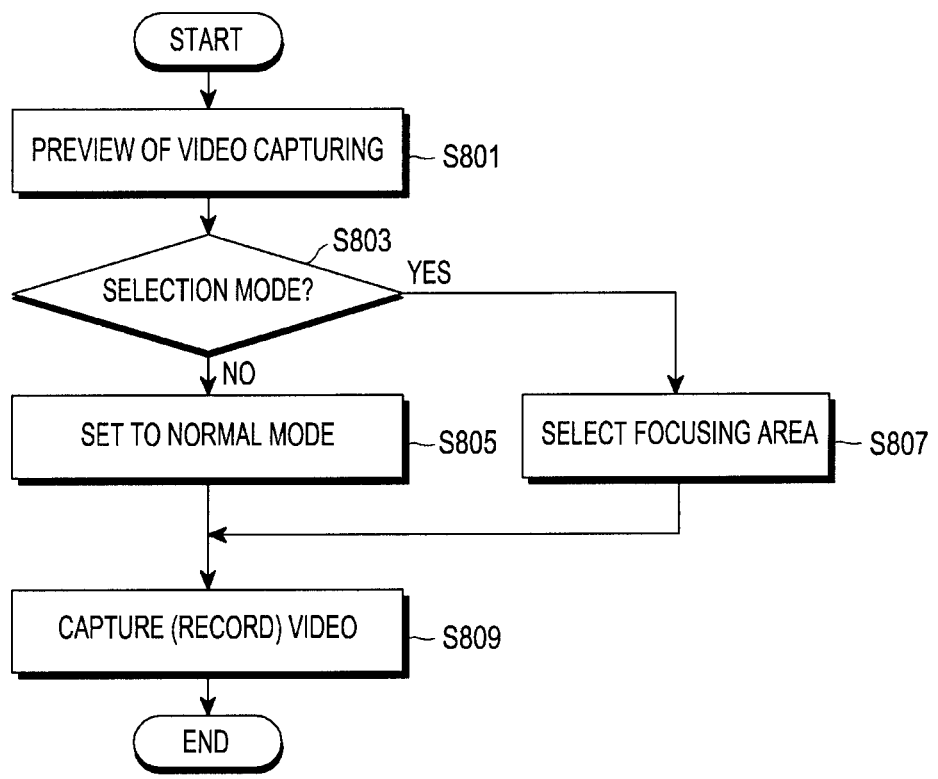
FIG. 8 is a flowchart illustrating a method for operating an electronic device according to an embodiment of the present disclosure.

FIG. 8 is a flowchart illustrating a method for operating an electronic device according to an embodiment of the present disclosure.

Referring to FIGS. 4 to 8, the processor 420 may capture a video using the camera module 410.

The processor 420 may obtain a preview video from the camera module 410 (S801). The processor 420 may also display the preview video on the display 480.

The processor 420 may determine whether the mode for capturing the video is a selection mode or normal mode (S803). Here, the selection mode may mean a video capturing mode for generating a video IM alternately including a plurality of frames focused on a plurality of selected areas, respectively. The normal mode may mean a video capturing mode for generating a video including a plurality of frames focused on a particular area.

When the video capturing mode is the normal mode (No in S803), the processor 420 may control the camera module 410 to generate a video including a plurality of frames focused on a particular area (S805).

When the video capturing mode is the selection mode (Yes in S803), the processor 420 may select focusing areas for a plurality of areas included in the preview video (S807). The focusing areas may be selected directly by the user or automatically by the processor 420.

The processor 420 may capture (or record) a video IM including each of the plurality of frames focused on the plurality of selected areas (S809).

Figure 9:
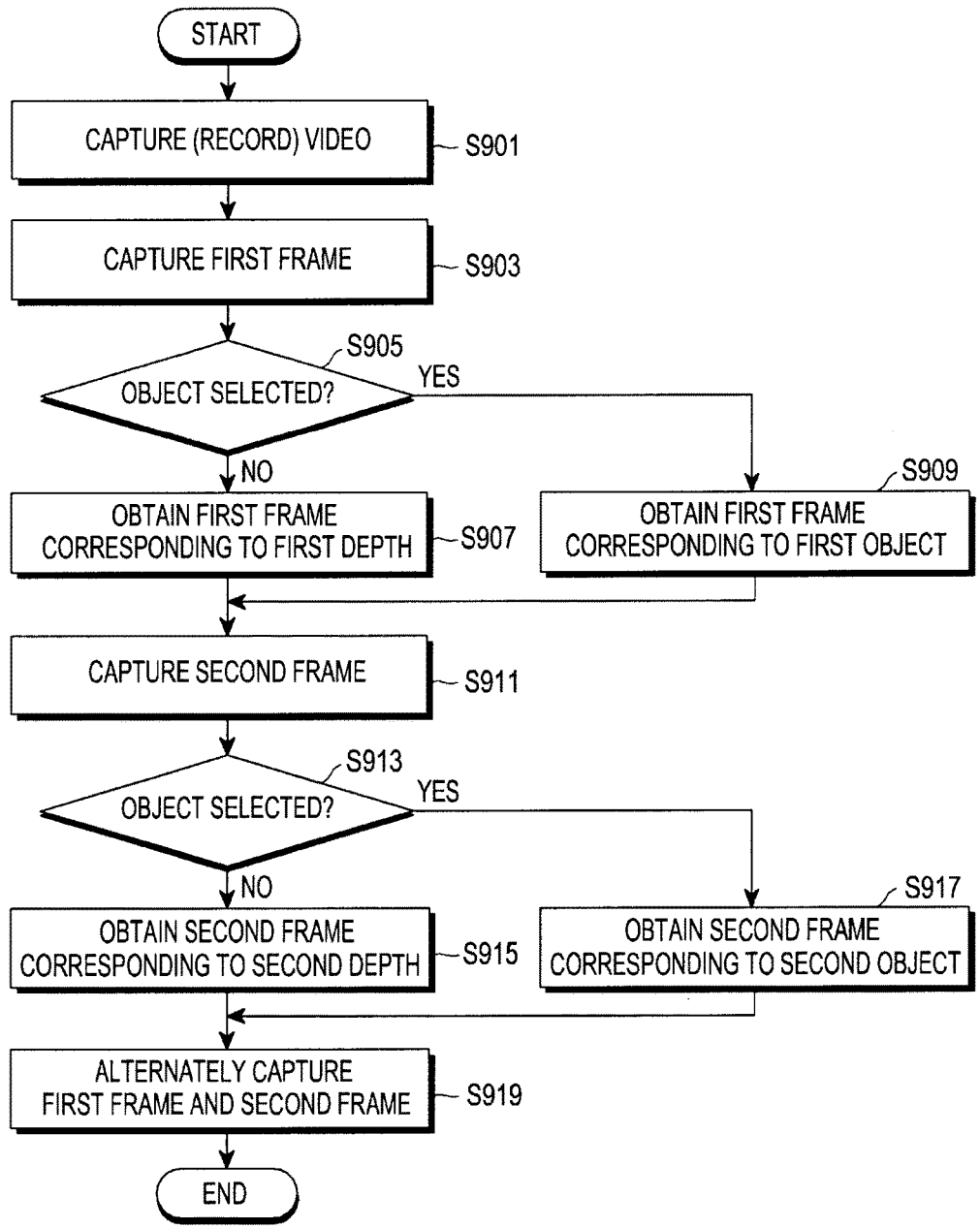
FIG. 9 is a flowchart illustrating a method for operating an electronic device according to an embodiment of the present disclosure.

FIG. 9 is a flowchart illustrating a method for operating an electronic device according to an embodiment of the present disclosure.

Referring to FIGS. 4 to 9, the processor 420 may capture (or record) a video IM including each of a plurality of frames focused on a plurality of selected areas using the camera module 410 (S901).

According to an embodiment of the present disclosure, the processor 420 may capture a first frame FR1 focused on a first area (S903).

The processor 420 may determine whether to select an object based on a plurality of objects included in a preview video (S905).

When no object is selected (No in S905), the processor 420 may obtain the first frame FR1 focused on the first area corresponding to a first depth (S907). For example, the processor 420 may obtain the first frame FR1 focused at the first depth using a depth map obtained from the preview video. By way of example, if the camera module 410 is embodied as a stereo camera module, a depth map may be obtained as a disparity map. Other ways of obtaining a depth map are also contemplated.

When an object is selected (Yes in S905), the processor 420 may obtain the first frame FR1 focused on the first area corresponding to a first object (S909). For example, the processor 420 may obtain the first frame FR1 focused on the first object using object tracking for the object included in the preview video.

According to an embodiment of the present disclosure, the processor 420 may capture a second frame FR2 focused on a second area (S911). The second area may mean an area different from the first area.

The processor 420 may determine whether to select an object based on a plurality of objects included in a preview video (S913).

When no object is selected (No in S913), the processor 420 may obtain the second frame FR2 focused on the second area corresponding to a second depth (S915). For example, the processor 420 may obtain the second frame FR2 focused at the second depth using a depth map obtained from the preview video. The second depth may mean a depth different from the first depth.

When an object is selected (Yes in S913), the processor 420 may obtain the second frame FR2 focused on an area corresponding to the second object (S917). For example, the processor 420 may obtain the second frame FR2 focused on the second object using object tracking for the object included in the preview video. The second object may mean an object different from the first object.

The processor 420 may alternately store (or capture) the first frame FR1 and the second frame FR2 (S919). The processor 420 may alternately store (or capture) the first frame FR1 and the second frame FR2, generating a video IM.

Figure 10:
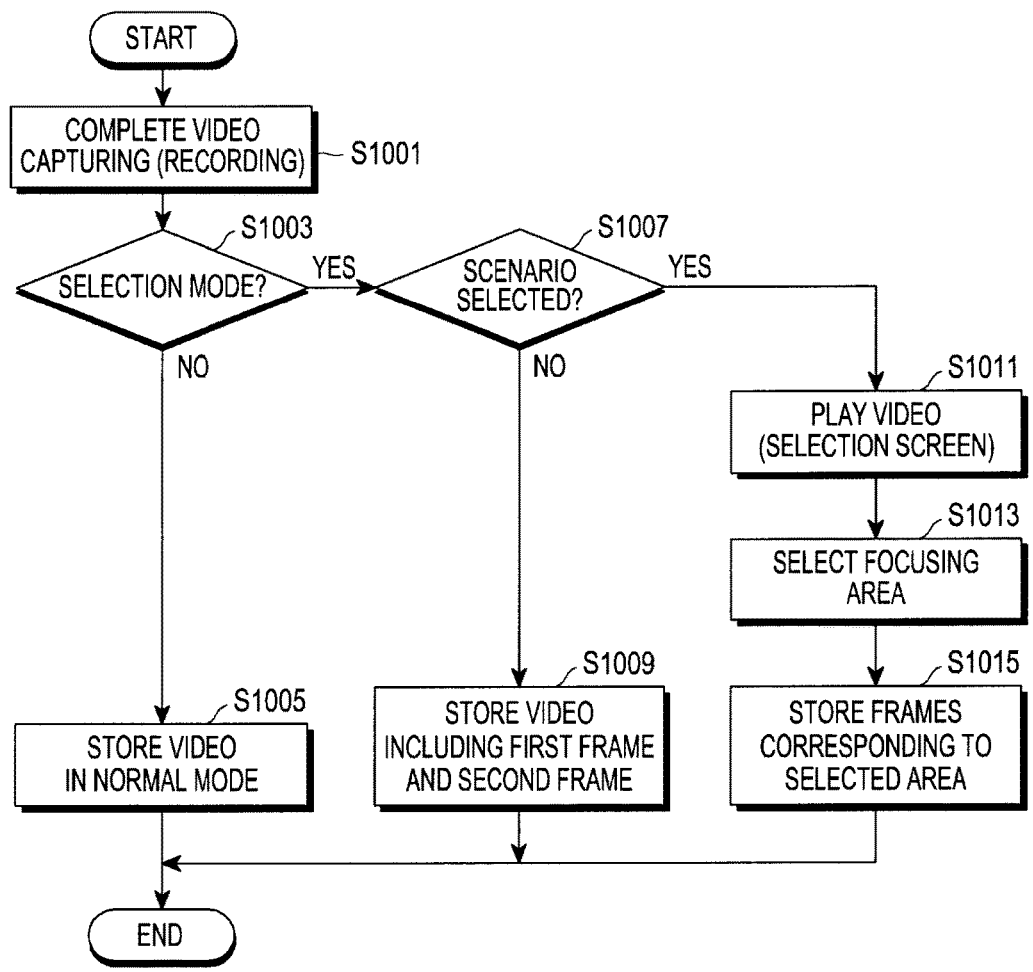
FIG. 10 is a flowchart illustrating a method for operating an electronic device according to an embodiment of the present disclosure.

FIG. 10 is a flowchart illustrating a method for operating an electronic device according to an embodiment of the present disclosure.

Referring to FIGS. 4 to 10, the processor 420 may capture a video IM using the camera module 410 and complete the video capturing (S1001). For example, the processor 420 may alternately capture the first frame FR1 and the second frame FR2 and complete the video capturing (or recording).

The processor 420 may edit the captured video IM. Here, processor 420 may edit the captured video IM and store the edited video in the memory 470 in response to the user's selection.

The processor 420 may determine whether the mode for capturing the video is a selection mode or normal mode (S1003).

When the video capturing mode is the normal mode (No in S1003), the processor 420 may store a video including a plurality of frames focused on a particular area (S1005). In other words, in the normal mode, the processor 420 may store, in the memory 470, the video including the plurality of frames focused on the particular area without being edited specially.

When the video capturing mode is the selection mode (Yes in S1003), the processor 420 may edit a video IM including a plurality of frames focused on a plurality of areas.

The processor 420 may determine whether the user selects a scenario in the operation of editing the video IM (S1007).

When the user selects no scenario (No in S1007), the processor 420 may store the video IM including the plurality of frames focused on the plurality of areas, without specially editing, in the memory 470 (S1009). At this time, the processor 420 may edit the stored video IM at the user's later request.

When the user selects a scenario (Yes in S1007), the processor 420 may edit the video IM including the plurality of frames focused on the plurality of areas.

According to an embodiment of the present disclosure, the processor 420 may play back the video on the display 480 to edit the video IM (S1011).

The processor 420 may select a focusing area in response to a touch input on the touchscreen 485 (S1013).

The processor 420 may store, in the memory 470, a frame corresponding to the selected area, based on a selection signal CS transmitted from the touchscreen 485 (S1015). For example, where the selected area is a first area, the processor 420 may store a first frame FR1 corresponding to the first area. When the selected area is a second area, the processor 420 may store a second frame FR2 corresponding to the second area.

According to an embodiment of the present disclosure, the user may select the first area from a first time to a second time and the second area from the second time to a third time. In this case, the processor 420 may store a first video IM1 including the first frame FR1 from the first time to the second time and a second video IM2 including the second frame FR2 from the second time to the third time.

Figure 11:
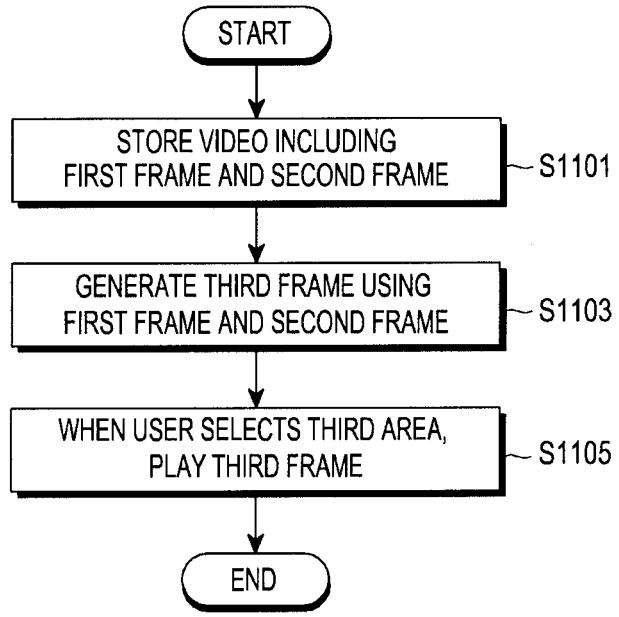
FIG. 11 is a flowchart illustrating a method for operating an electronic device according to an embodiment of the present disclosure.

FIG. 11 is a flowchart illustrating a method for operating an electronic device according to an embodiment of the present disclosure.

Referring to FIGS. 4 to 11, the processor 420 may store a video IM alternately including a first frame FR1 and a second frame FR2 (S1101).

The processor 420 may use the first frame FR1 focused on a first area and the second frame FR2 focused on a second area, generating a third frame focused on a third area (S1103). For example, the third area may mean a middle area between the first area and the second area.

The processor 420 may also generate a third video including the third frame focused on the third area.

According to an embodiment of the present disclosure, when the user selects the third area, the processor 420 may display the third frame focused on the third area. For example, where the user selects the third area, the processor 420 may play back the third video including the third frame focused on the third area.

Figure 12:
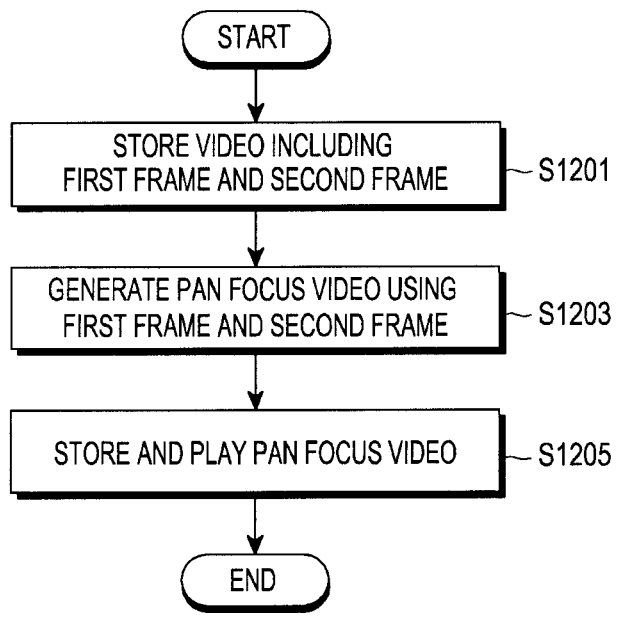
FIG. 12 is a flowchart illustrating a method for operating an electronic device according to an embodiment of the present disclosure.

FIG. 12 is a flowchart illustrating a method for operating an electronic device according to an embodiment of the present disclosure.

Referring to FIGS. 4 to 12, the processor 420 may store a video IM alternately including a first frame FR1 and a second frame FR2 (S1201).

The processor 420 may use the first frame FR1 focused on a first area and the second frame FR2 focused on a second area, generating a pan focus video (S1203). For example, the pan focus video may mean a video focused in the whole area of the video.

According to an embodiment of the present disclosure, where the user selects an area included in the video, the processor 420 may display a frame focused on the area. For example, where the user selects the area, the processor 420 may store and/or play back the video focused on the area (S1205). The video focused on the area may mean the pin focus video.

According to an embodiment of the present disclosure, where the user selects an area included in the video, the processor 420 may display a frame that is focused on the area with the remaining area blurred. For example, where the user selects the area, the processor 420 may play back the video that is focused on the area, with the other areas blurred.

Figure 13:
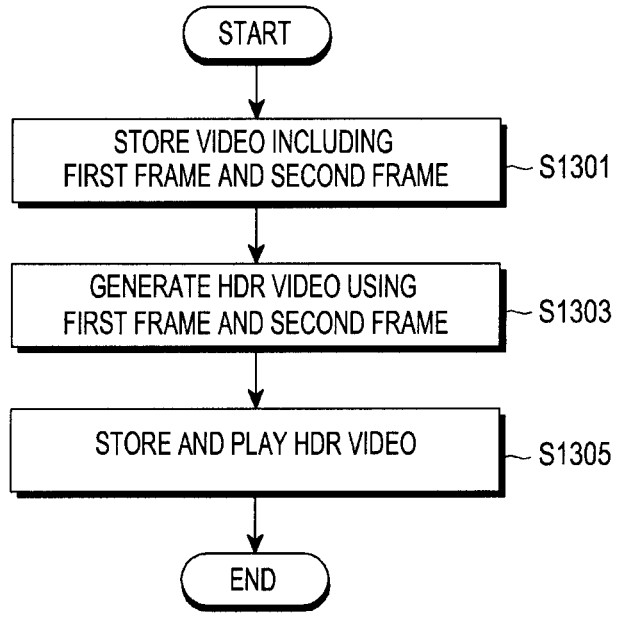
FIG. 13 is a flowchart illustrating a method for operating an electronic device according to an embodiment of the present disclosure.

FIG. 13 is a flowchart illustrating a method for operating an electronic device according to an embodiment of the present disclosure.

Referring to FIGS. 4 to 13, the processor 420 may store a video IM alternately including a first frame FR1 and a second frame FR2 (S1301).

The processor 420 may use the first frame FR1 focused on a first area and the second frame FR2 focused on a second area, generating an HDR video (S1303). For example, where the first frame FR1 and the second frame FR2 differ in brightness from each other, the processor 420 may generate the HDR video using the first frame FR1 and the second frame FR2.

According to an embodiment of the present disclosure, the processor 420 may store and/or play back the HDR video when the user requests the HDR video (S1305).

Figure 14:
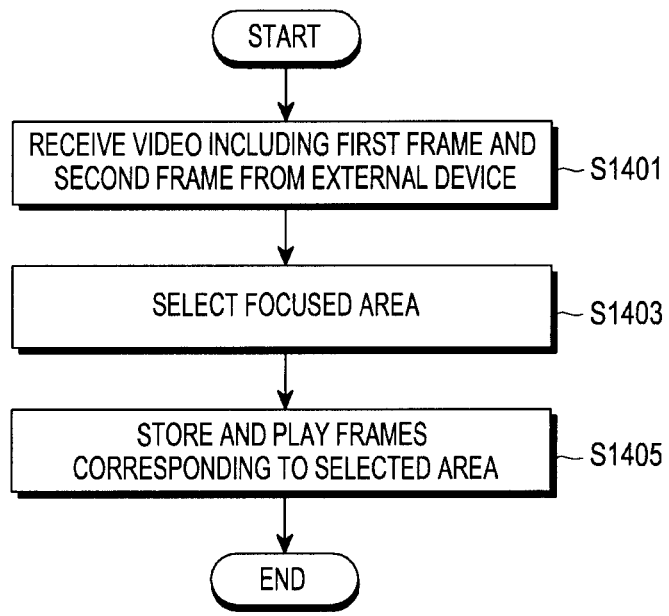
FIG. 14 is a flowchart illustrating a method for operating an electronic device according to an embodiment of the present disclosure.

FIG. 14 is a flowchart illustrating a method for operating an electronic device according to an embodiment of the present disclosure.

Referring to FIGS. 4 and 14, the processor 420 may receive a video IM' alternately including a first frame FR1 and a second frame FR2 from an external device through the communication module 490 (S1401).

According to an embodiment of the present disclosure, the processor 420 may select a focusing area in response to a touch input on the touchscreen 485 (S1403).

According to an embodiment of the present disclosure, when there is no user selection through the touchscreen 485, the processor 420 may store in the memory 470, or display on the display 480, a video IM' including a plurality of frames focused on a plurality of areas.

When the user selects a focusing area through the touchscreen 485, the processor 420 may store and/or play back a video including the frame focused on the selected area.

For example, where the selected area is a first area in the video IM', the processor 420 may store a first frame FR1 corresponding to the first area. When the selected area is a second area in the video IM', the processor 420 may store a second frame FR2 corresponding to the second area.

According to an embodiment of the present disclosure, the user may select the first area from a first time to a second time and the second area from the second time to a third time. In this case, the processor 420 may store a first video IM1 including the first frame FR1 from the first time to the second time and a second video IM2 including the second frame FR2 from the second time to the third time.

The processor 420 may play back the stored first video IM1 and/or the second video IM2.

For ease of description, objects represented brighter may mean focused objects or areas while objects represented darker may mean objects or areas that have not been focused in the subsequent figures.

Figure 15A:
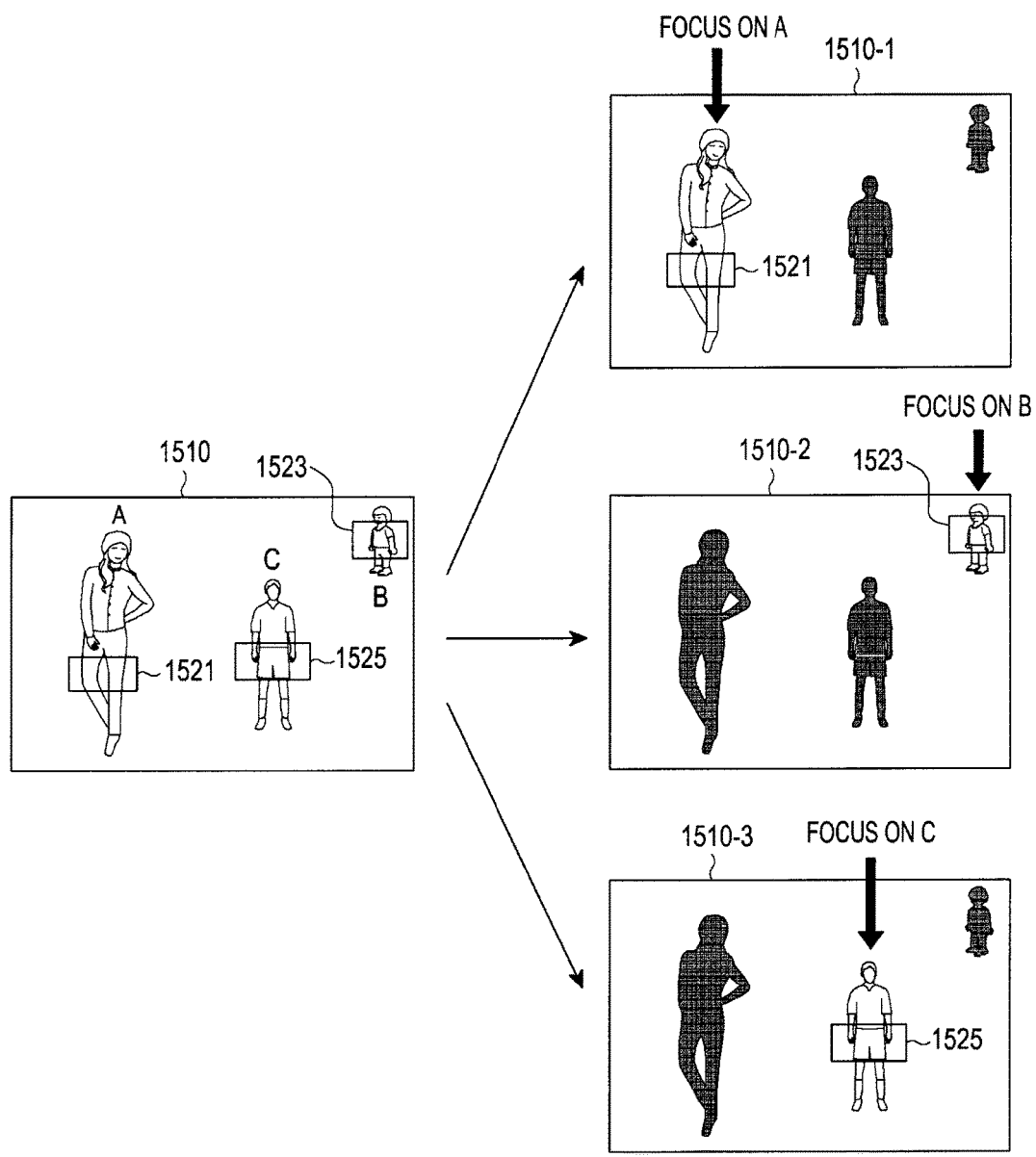
FIG. 15A and FIG. 15B are diagrams illustrating operations in which a plurality of frames each focus an area in a video according to an embodiment of the present disclosure.
Figure 15B:
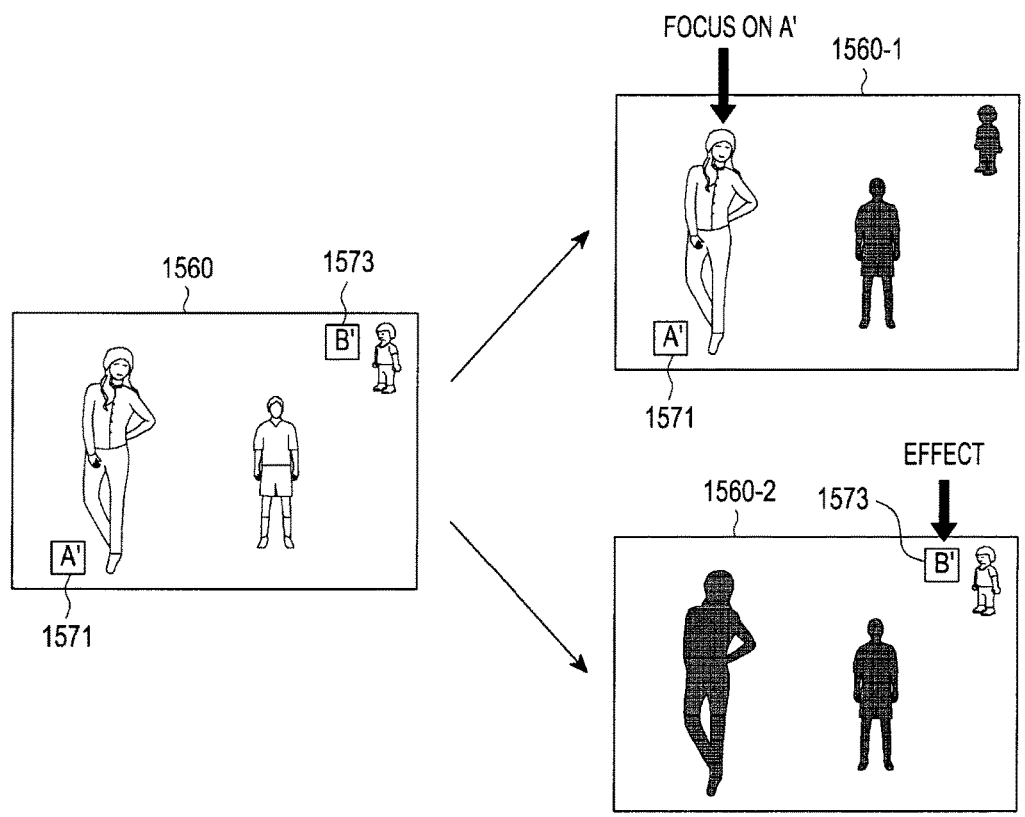

FIGS. 15A and 15B are diagrams illustrating operations in which a plurality of frames each focus an area in a video according to an embodiment of the present disclosure.

FIG. 15A is a diagram illustrating the operation of focusing an area corresponding to a plurality of objects included in a video.

Referring to FIGS. 4 to 15A, the processor 420 may display, through the display 480, a preview video 1510 obtained through the camera module 410.

The processor 420 may select a focusing area (frame area) based on a plurality of objects 1521, 1523, and 1525 included in the preview video 1510. For example, the processor 420 may determine the focusing area of each of the plurality of objects using object tracking for the objects included in the preview video 1510.

According to an embodiment of the present disclosure, the preview video 1510 may include a first object 1521, a second object 1523, and a third object 1525. In an example, first object 1521 may correspond to the "A" frames and second object 1523 may correspond to the "B" frames discussed earlier in connection with FIGS. 4-14, while object 1525 corresponds to an additional "C" frames periodically interspersed between the A frames and B frames.

For example, the processor 420 may obtain a first frame 1510-1 focused on a first area 1521 corresponding to the first object 1521. The processor 420 may obtain a second frame 1510-2 focused on a second area 1523 corresponding to the second object 1523. The processor 420 may obtain a third frame 1510-3 focused on a third area 1525 corresponding to the third object 1525.

The processor 420 may sequentially and alternately capture and store the first frame 1510-1, the second frame 1510-2, and the third frame 1510-3. The processor 420 may sequentially and alternately capture the first frame 1510-1, the second frame 1510-2, and the third frame 1510-3, generating (or recording) a video IM. The capture may be repeated periodically, so that three videos are generated: a first video corresponding to periodically captured first frames 1510-1; a second video corresponding to periodically captured second fames 1510-2; and a third video corresponding to periodically captured third frames 1510-3.

FIG. 15B is a diagram illustrating the operation of focusing an area corresponding to a plurality of depths included in a video.

Referring to FIGS. 4 to 15B, the processor 420 may display, through the display 480, a preview video 1560 obtained through the camera module 410.

The processor 420 may select a focusing area based on the depth of a plurality of areas included in the preview video 1560. For example, the processor 420 may determine the focusing area of each of the plurality of areas using a depth map for the areas included in the preview video 1560.

According to an embodiment of the present disclosure, the preview video 1560 may include areas with various depths. For example, the preview video 1560 may include a first area 1571 corresponding to a first depth and a second area 1573 corresponding to a second depth.

The processor 420 may obtain a first frame 1560-1 focused on the first area 1571 corresponding to the first depth. The processor 420 may obtain a second frame 1560-2 focused on the second area 1573 corresponding to the second depth.

The processor 420 may sequentially and alternately capture and store the first frame 1560-1 and the second frame 1560-2. The processor 420 may sequentially and alternately capture the first frame 1560-1 and the second frame 1560-2, generating (or recording) a video IM. (Periodic first frames 1560-1 may generate a first video of first frames A' while periodic second frames 1560-2, alternating with the first frames 1560-1, may generate a second video of second frames B', akin to the first frames A and second frames B discussed above, respectively.)

Meanwhile, the processor 420 may generate N types of frames based on N areas focused. For example, the processor 420 may determine the number in type of the frames generated based on the number of areas focused.

Figure 16A:
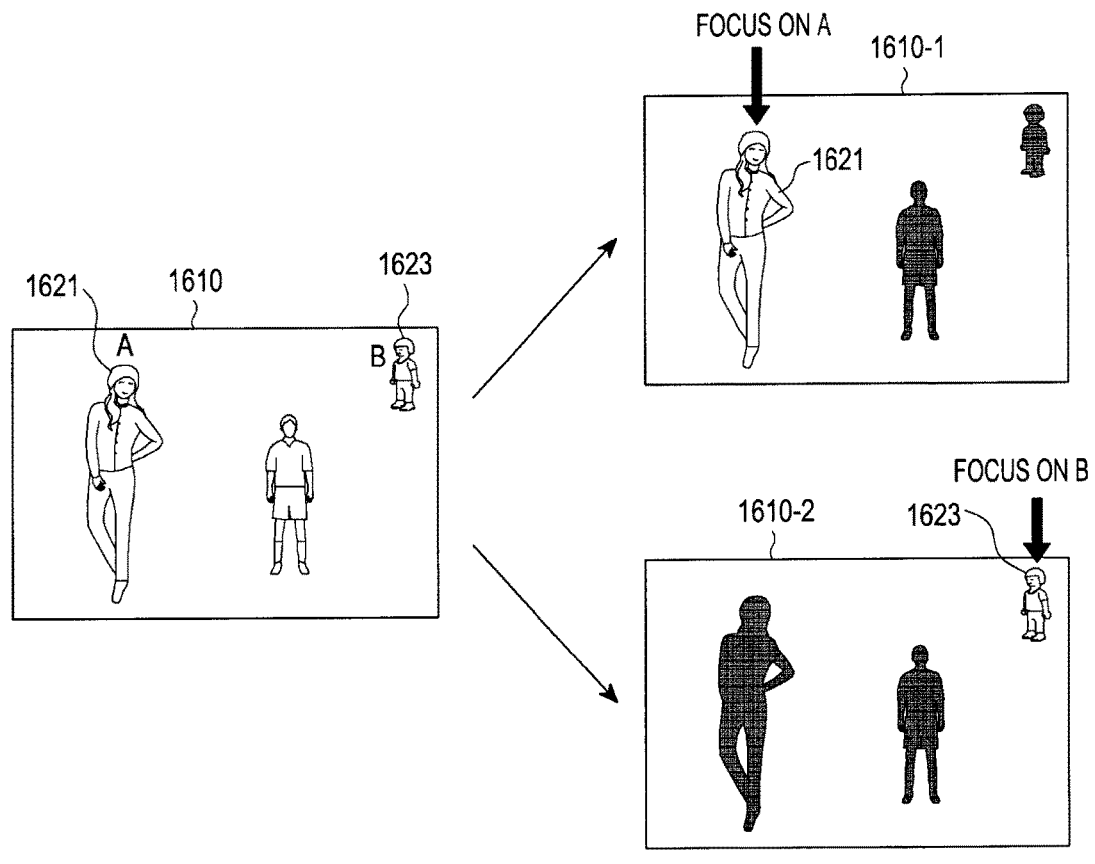
FIG. 16A, FIG. 16B and FIG. 16C are diagrams illustrating respective aspects of a method for operating an electronic device according to an embodiment of the present disclosure.
Figure 16B:
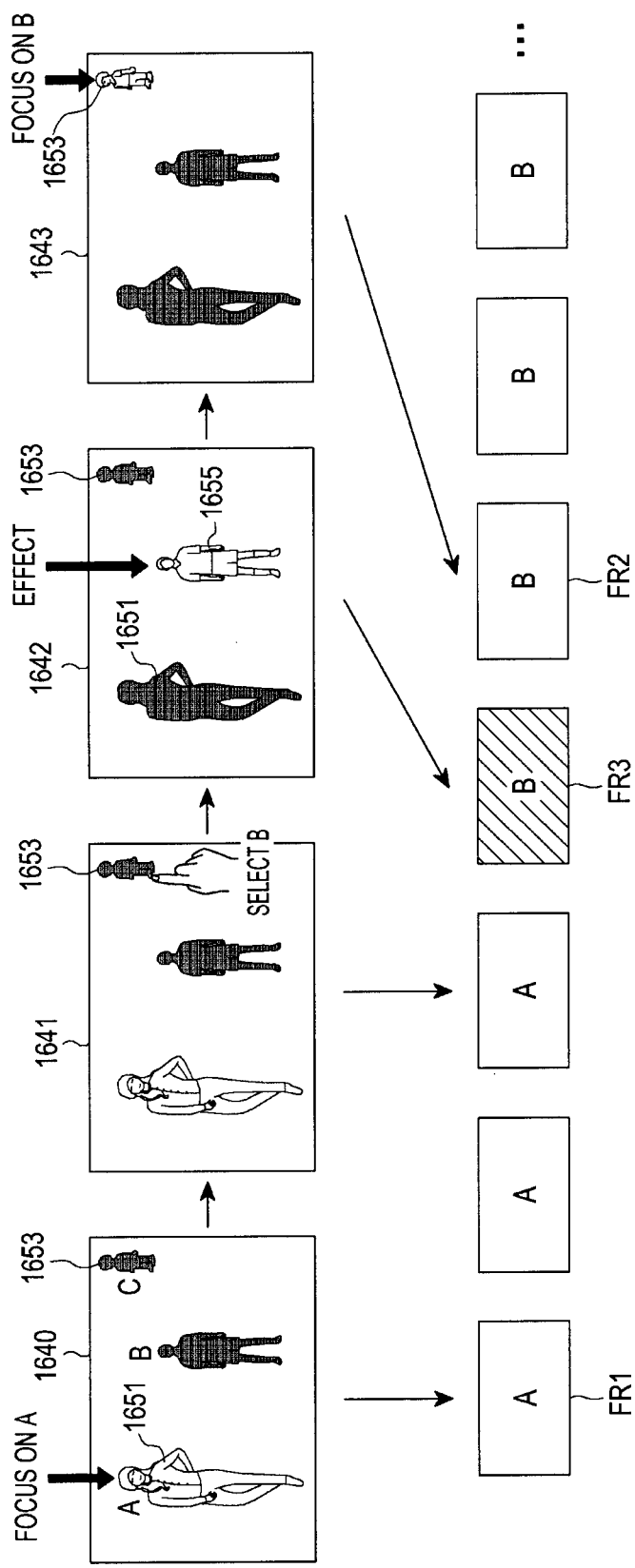
Figure 16C:
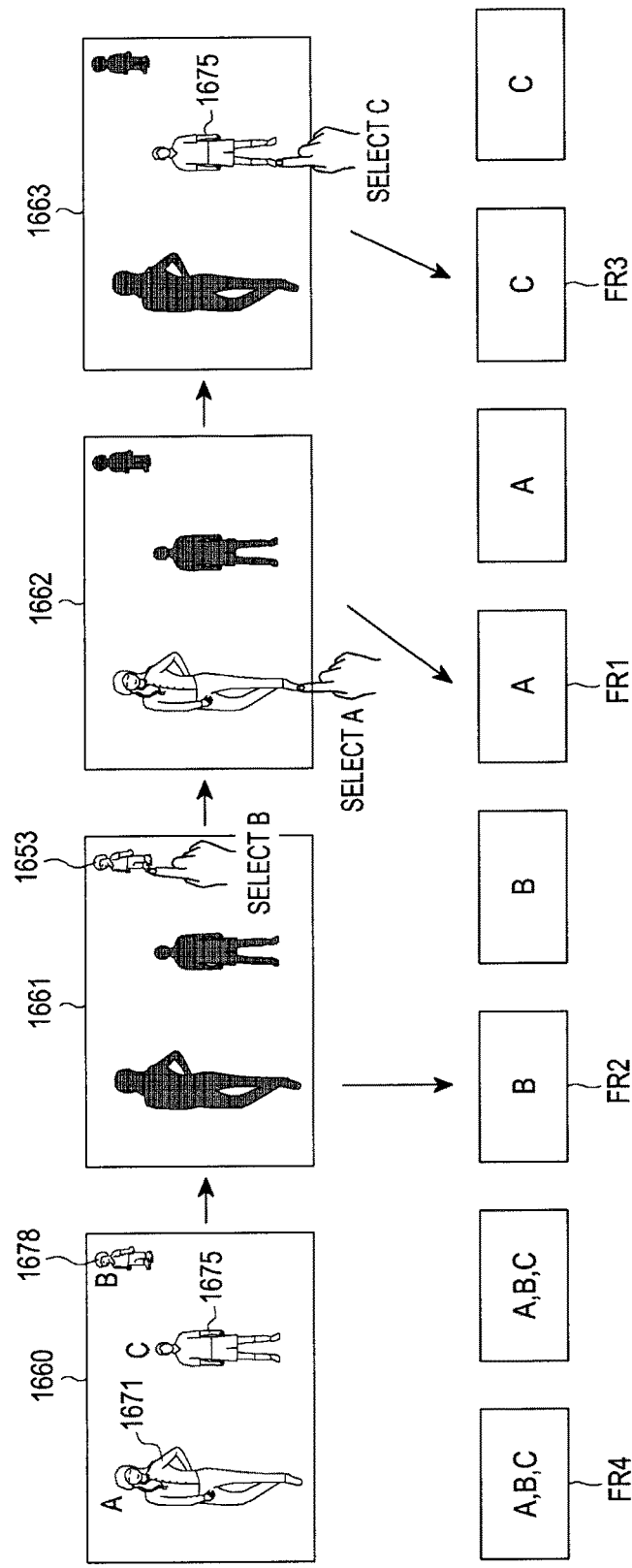

FIGS. 16A, 16B and 16C are diagrams illustrating a method for operating an electronic device according to an embodiment of the present disclosure.

FIG. 16A is a diagram illustrating operations in which an electronic device captures (or records) a video according to an embodiment of the present disclosure.

Referring to FIGS. 4 to 16A, the processor 420 may sequentially and alternately capture (or record) each of a plurality of frames respectively focused on a plurality of frame areas using the camera module 410.

A preview video 1610 may include a first object 1621 corresponding to a first area and a second object 1623 corresponding to a second area.

According to an embodiment of the present disclosure, the processor 420 may obtain (or record), using the camera module 410, a first frame 1610-1 focused on the first object 1621 included in the preview video 1610 and a second frame 1610-2 focused on the second area 1623 in the preview video 1610. At this time, the processor 420 may alternately (or "sequentially and alternately") obtain the first frame 1610-1 and the second frame 1610-2.

According to an embodiment of the present disclosure, the processor 420 may alternately obtain (or record) the first frame 1610-1 and the second frame 1610-2 at a first frame rate.

The processor 420 may generate a first streaming video (e.g., a first video IM1) per first frame 1610-1 focused on the first area using the codec 430. The processor 420 may also generate a second streaming video (e.g., a second video IM2) per second frame 1610-2 focused on the second area using the codec 430.

FIG. 16B is a diagram illustrating operations in which an electronic device plays back a video according to an embodiment of the present disclosure.

Referring to FIGS. 4 to 16B, the processor 420 may store (or record) a video IM alternately including a first frame 1610-1 and a second frame 1610-2.

The processor 420 may play back, on the display, videos 1640 to 1643 alternately including the first frame FR1 and the second frame FR2.

According to an embodiment of the present disclosure, the processor 420 may display, on the display 480, a first video 1640, 1641 including the first frame FR1 focused on the first object 1651.

While the first video 1640, 1641 is played back, the processor 420 may receive a touch input on the second object 1653 through the touchscreen 485.

The processor 420 may play back, on the display 480, the second video 1643 including the second frame FR2 focused on the second object 1653.

According to an embodiment of the present disclosure, the processor 420 may gradually play back, on the display 480, the second video 1643 including the second frame FR2 focused on the second object 1653.

For example, the processor 420 may generate a third frame FR3 focused on the third object 1655 using the first frame FR1 focused on the first object 1651 and the second frame FR2 focused on the second object 1653. The processor 420 may also generate a third video 1642 including the third frame FR3 focused on the third object 1655.

According to an embodiment of the present disclosure, where the user selects the second area 1653, the processor 420 may play back the third frame FR3 focused on the third object 1655 before displaying the second frame FR2 focused on the second object 1653.

By doing so, the processor 420 may provide the user with such an effect as if the first video 1641 gradually changes to the second video IM2. The processor 420 may also provide such an effect as if it seeks the focus (e.g., a wobbling effect) when the first video 1641 changes to the second video 1643.

Meanwhile, the processor 420 may control the exposure time and white balance of each of the frames focused on the objects selected through the touchscreen 485.

FIG. 16C is a diagram illustrating operations in which an electronic device plays back a video according to an embodiment of the present disclosure.

Referring to FIGS. 4 to 16C, the processor 420 may store (or record) a video IM alternately including a first frame 1610-1 and a second frame 1610-2.

According to an embodiment of the present disclosure, the processor 420 may generate a pan focus frame FR4 focused on all the objects using the first frame FR1 and the second frame FR2. The processor 420 may also generate a pan focus video 1660 using the pan focus frame FR4.

According to an embodiment of the present disclosure, where the user selects an area included in the video, the processor 420 may display a frame focused on the area using the pan focus frame FR4.

For example, when the second object 1673 is selected through the touchscreen 485, the processor 420 may play back the video 1661 focused on the second object 1673. When the first object 1671 is selected through the touchscreen 485, the processor 420 may play back the video 1662 focused on the first object 1671. When the third object 1675 is selected through the touchscreen 485, the processor 420 may play back the video 1663 focused on the third object 1671.

According to an embodiment of the present disclosure, where the user selects an area included in the video, the processor 420 may play back a video that is focused on the area with the remaining area blurred. When the second object 1673 is selected through the touchscreen 485, the processor 420 may play back a video that is focused on the second object 1673 with the other areas blurred.

Meanwhile, the processor 420 may control the exposure time and white balance of each of the frames focused on the objects selected through the touchscreen 485.

Although FIGS. 16A to 16C illustrate only the configuration of a plurality of frames focused based on objects included in the preview video for ease of description, the technical features of the present disclosure are not limited thereto. The technical spirit of the present disclosure is not limited by the number or position of the objects shown in FIGS. 16A to 16C.

According to an embodiment of the present disclosure, an electronic device may comprise a camera module, a memory, and a processor sequentially storing, in the memory, each of a plurality of frames respectively focused on a plurality of areas selected from a video obtained through the camera module when the video is captured.

The processor may alternately store, in the memory, a first frame focused on a first area included in the video and a second frame focused on a second area included in the video.

The processor may determine a focus shift time during which focusing on the first area changes to focusing on the second area and determines an exposure time of the second frame based on the focus shift time.

The processor may adjust at least one of a sensitivity and frame rate of the camera module based on the exposure time of the second frame.

The processor may generate a pan focus video using the first frame and the second frame.

The processor may generate a high definition range (HDR) video using the first frame and the second frame.

The processor may focus each of the plurality of frames based on objects included in the video.

The processor may control the white balance of each of the plurality of frames.

The electronic device may further comprise a touchscreen. The processor may store, in the memory, frames corresponding to an area selected through the touchscreen among the plurality of frames.

The electronic device may further comprise a touchscreen. The processor may display frames corresponding to an area selected through the touchscreen among the plurality of frames.

The processor may determine a frame rate of the frames corresponding to the area selected through the touchscreen based on the number of focused areas in the video.

According to an embodiment of the present disclosure, a method for operating an electronic device may comprise selecting a plurality of areas from a video obtained from a camera module upon capturing the video, obtaining each of a plurality of frames respectively focused on the plurality of areas selected from the video, and sequentially storing each of the plurality of frames in a memory.

Obtaining each of the plurality of frames may include alternately obtaining a first frame focused on a first area included in the video and a second frame focused on a second area included in the video.

Obtaining each of the plurality of frames may include determining a focus shift time during which focusing on the first area changes to focusing on the second area and determining an exposure time of the second frame based on the focus shift time.

The method may further comprise adjusting the sensitivity of the camera module based on the exposure time of the second frame.

The method may further comprise generating a pan focus video using the first frame and the second frame.

The method may further comprise generating a high definition range (HDR) video using the first frame and the second frame.

Obtaining each of the plurality of frames may include focusing each of the plurality of frames based on objects included in the video.

Obtaining each of the plurality of frames may include determining a white balance for each of the plurality of frames.

Sequentially storing each of the plurality of frames may include storing, in the memory, frames corresponding to an area selected from the plurality of frames.

The method may further comprise displaying frames corresponding to an area selected from the plurality of frames.

Displaying the frames corresponding to the selected area may include determining a frame rate of the frames corresponding to the selected area based on the number of focused areas in the video.

According to an embodiment of the present disclosure, an electronic device may comprise a display, a memory storing, at a first frame rate, first frames focused on a first area included in a video and second frames focused on a second area included in the video and obtained alternately with the first frames, and a processor playing any one of the first frames and the second frames through the display at a second frame rate.

The electronic device may further comprise a touchscreen. The processor may play any one of the first frames and the second frames selected through the touchscreen.

The processor may determine the second frame rate based on the first frame rate and the number of areas focused in the video.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

As is apparent from the foregoing description, according to the embodiments of the present disclosure, when the user selects an object or area included in a captured video while playing back the video, the electronic device may change, in real-time, the focus of the video in the selected object or area.

The embodiments disclosed herein are proposed for description and understanding of the disclosed technology and does not limit the scope of the present disclosure. Accordingly, the scope of the present disclosure should be interpreted as including all changes or various embodiments based on the technical spirit of the present disclosure.

What is claimed is:

1. An electronic device, comprising:
a camera module;
a touch screen;
a memory; and
a processor configured to:
identify focusing areas corresponding to a plurality of objects included in a preview video obtained from the camera module;
obtain a video including a plurality of frames which are alternately focused on the identified focusing areas;
store, in the memory, the plurality of frames alternately focused on the identified focusing areas;
in response to request for playing back the video, play back, on the touch screen, a first video including frames focused on a first focusing area among the focusing areas; and
in response to a user's selection via the touch screen while playing back the first video, play hack, on the touch screen, a second video including frames focused on a second focusing area which is different from the first focusing area among the focusing areas.

2. The electronic device of claim 1, wherein the processor is configured to:
alternately obtain a first frame focused on the first focusing area corresponding to a first depth or a first object, and a second frame focused on the second focusing area corresponding to a second depth or a second object, based on the plurality of objects included in the preview video, and
alternately store, in the memory, the first frame and the second frame.

3. The electronic device of claim 2, wherein the processor is configured to:
determine a focus shift time during which focusing on the first focusing area changes to focusing on the second focusing area, and
determine an exposure time of the second frame based on the focus shift time,
whereby a frame rate interval includes a readout time of the first frame, the focus shift time and the exposure time of the second frame.

4. The electronic device of claim 3,
wherein the camera module comprises an image sensor, and
wherein the processor is configured to adjust at least one of a sensitivity and frame rate of the image sensor based on the exposure time of the second frame such that when the second exposure time is shorter than a preset time, the processor increases the sensitivity of the image sensor.

5. The electronic device of claim 2, wherein the processor is configured to generate a pan focus video comprising pan focus frames which are focused on all the plurality of objects using the first frame and the second frame.

6. The electronic device of claim 2, wherein the processor is configured to generate a high definition range (HDR) video using the first frame and the second frame, which differ in brightness from each other.

7. The electronic device of claim 2, wherein the processor is configured to generate a third frame using the first frame and the second frame, and
wherein the third frame is a frame focused on a middle area between the first focusing area and the second focusing area.

8. The electronic device of claim 1, wherein the processor is configured to focus each of the plurality of frames based on the plurality of objects included in the preview video.

9. The electronic device of claim 1, wherein the processor is configured to determine a white balance for each of the plurality of frames.

10. The electronic device of claim 1, wherein the processor is configured to store, in the memory, frames corresponding to a focusing area selected through the touch screen among the obtained plurality of frames.

11. The electronic device of claim 1, wherein the processor is configured to play back a video including frames corresponding to an area selected through the touch screen among the plurality of frames.

12. The electronic device of claim 11, wherein the processor determines a frame rate of the frames corresponding to the area selected through the touch screen based on the number of focused areas in the preview video.

13. A method for operating an electronic device, the method comprising:
identifying focusing areas corresponding to a plurality of objects included in a preview video obtained from a camera of the electronic device;
obtaining a video including a plurality of frames alternately focused on the identified focus areas;
storing, in a memory of the electronic device, the plurality of frames alternately focused on the identified focusing areas;
in response to request for playing back the video, playing back, on a touch screen of the electronic device, a first video including frames focused on a first focusing area among the focusing areas; and
in response to a user's selection via the touch screen while playing back the first video, playing back, on the touch screen, a second video including frames focused on a second focusing area which is different from the first focusing area among the focusing areas.

14. The method of claim 13, wherein obtaining the video includes:
alternately obtaining a first frame focused on the first focusing area corresponding to a first depth or a first object and a second frame focused on the second focusing area corresponding to a second depth or a second object, based on the plurality of objects included in the preview video; and
alternately storing, in the memory, the first frame and the second frame.

15. The method of claim 14, wherein obtaining the video includes:
determining a focus shift time during which focusing on the first focusing area changes to focusing on the second focusing area; and
determining an exposure time of the second frame based on the focus shift time,
whereby a frame rate interval includes a readout time of the first frame, the focus shift time and the exposure time of the second frame.

16. The method of claim 15, further comprising adjusting at least one of a sensitivity and frame rate of the camera based on the exposure time of the second frame such that when the second exposure time is shorter than a preset time, a processor increases the sensitivity.

17. The method of claim 13, wherein obtaining the video includes focusing each of the plurality of frames based on the plurality of objects included in the preview video.

18. The method of claim 13, wherein obtaining the video includes determining a white balance for each of the plurality of frames.

19. An electronic device, comprising:
a touch screen;
a memory configured to store a video including a plurality of frames which are alternately focused on focusing areas, wherein the plurality of frames includes first frames focused on a first focusing area included in the video and second frames focused on a second focusing area included in the video, the second frames alternating with the first frames, and the first and second frames having been captured at a first frame rate;
a processor configured to play back, on the touch screen, a video corresponding to one of the first frames and the second frames at a second frame rate differing from the first frame rate; and
in response to a user's selection via the touch screen while playing back the video corresponding the one of the first frames and the second frames, play back, on the touch screen, a video corresponding to another of the first frames and the second frames.

20. The electronic device of claim 19, wherein the processor determines the second frame rate based on the first frame rate and the number of focusing areas focused in the video.

* * * * *